US012215523B2

(12) United States Patent
Sims et al.

(10) Patent No.: US 12,215,523 B2
(45) **Date of Patent: *Feb. 4, 2025**

(54) ELECTRIC STRIKE INCLUDING A BIASING MECHANISM FOR A KEEPER SUPPORT BRACKET

(71) Applicant: Hanchett Entry Systems, Inc., Phoenix, AZ (US)

(72) Inventors: Ryan M. Sims, Mesa, AZ (US); Baruch Spence, Phoenix, AZ (US); James Griffin, Chandler, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,846

(22) Filed: Sep. 6, 2023

(65) Prior Publication Data

US 2023/0407678 A1 Dec. 21, 2023

Related U.S. Application Data

(63) Continuation of application No. 17/222,399, filed on Apr. 5, 2021, now Pat. No. 11,761,242, which is a (Continued)

(51) Int. Cl.
*E05B 47/00* (2006.01)
*E05B 15/02* (2006.01)

(52) U.S. Cl.
CPC ........ *E05B 47/0047* (2013.01); *E05B 15/025* (2013.01); *E05B 47/0002* (2013.01); *E05B 47/0012* (2013.01); *Y10T 292/699* (2015.04)

(58) Field of Classification Search
CPC ............... E05B 15/025; E05B 47/0046; E05B 47/0047; Y10T 292/68; Y10T 292/696; Y10T 292/699; Y10T 292/702
See application file for complete search history.

(56) References Cited

U.S. PATENT DOCUMENTS 4,984,835 A 1/1991 Vadacchino et al.
5,511,839 A 4/1996 Fuss et al.
(Continued)

FOREIGN PATENT DOCUMENTS

DE 2056351 6/1972
EP 0841447 5/1998
(Continued)

*Primary Examiner* — Christine M Mills
*Assistant Examiner* — Noah Horowitz
(74) *Attorney, Agent, or Firm* — Woods Oviatt Gilman LLP; Dennis B. Danella, Esq.

(57) ABSTRACT

An actuator controlled electric strike for operating in conjunction with a latch of a lockset. The strike comprises a keeper support bracket movable between first and second positions. When the bracket is in the first position a keeper is held in either a locked or unlocked position, and when the bracket is in the second position the keeper is movable to the other position. An actuating mechanism is operatively connected to the bracket and is configured to allow the bracket to move between the first and second positions. First and second biasing mechanisms apply a net force to the bracket. The first biasing mechanism applies a first force to the bracket in the first direction, and the second biasing mechanism applies a second force to the bracket in the second direction. When the bracket is in the first position, the net force of the biasing member is approximately zero.

34 Claims, 17 Drawing Sheets

Related U.S. Application Data continuation-in-part of application No. 17/161,149, filed on Jan. 28, 2021, which is a continuation of application No. 15/098,041, filed on Apr. 13, 2016, now Pat. No. 10,934,744.

(60) Provisional application No. 62/147,468, filed on Apr. 14, 2015.

(56) References Cited

U.S. PATENT DOCUMENTS

| | | | | |
|---|---|---|---|---|
| 6,082,791 | A | 7/2000 | Frolov et al. | |
| 6,568,726 | B1 | 5/2003 | Caspi et al. | |
| 6,581,991 | B2 | 6/2003 | Galindo | |
| 6,595,564 | B1 * | 7/2003 | Hanchett | E05B 47/0047 292/341.15 |
| 6,874,830 | B2 | 4/2005 | Bashford | |
| 6,886,305 | B2 | 5/2005 | Ward | |
| 7,011,348 | B2 | 3/2006 | Milo | |
| 7,185,928 | B1 * | 3/2007 | Liao | E05B 47/0047 292/341.15 |
| 7,322,621 | B2 * | 1/2008 | Liao | E05B 47/0047 292/341.16 |
| 8,096,594 | B2 * | 1/2012 | Uyeda | E05B 47/0046 292/341.15 |
| 8,146,966 | B1 | 4/2012 | Webb et al. | |
| 8,366,160 | B2 | 2/2013 | Orbeta et al. | |
| 8,544,895 | B2 | 10/2013 | Webb et al. | |
| 8,833,814 | B2 | 9/2014 | Chang | |
| 8,851,532 | B2 * | 10/2014 | Geringer | E05B 15/0205 292/200 |
| 9,183,976 | B2 | 11/2015 | Hanchett, Jr. et al. | |
| 9,580,935 | B2 | 2/2017 | Singh | |
| 10,563,427 | B2 | 2/2020 | Sims et al. | |
| 11,136,791 | B2 | 10/2021 | Hsu | |
| 11,761,242 | B2 * | 9/2023 | Sims | E05B 47/0047 292/341.16 |
| 2006/0192397 | A1 | 8/2006 | Schnarr et al. | |
| 2007/0182168 | A1 | 8/2007 | Allen | |
| 2008/0006069 | A1 * | 1/2008 | Liao | E05B 63/0065 70/413 |
| 2008/0224481 | A1 | 9/2008 | Geringer et al. | |
| 2010/0038920 | A1 | 2/2010 | Tsai | |
| 2010/0116006 | A1 | 5/2010 | Huang | |
| 2010/0127518 | A1 | 5/2010 | Huang | |
| 2010/0289279 | A1 | 11/2010 | Toma | |
| 2011/0031768 | A1 | 2/2011 | Scheffler et al. | |
| 2011/0181060 | A1 | 7/2011 | Geringer et al. | |
| 2012/0091739 | A1 | 4/2012 | Ross et al. | |
| 2013/0088023 | A1 | 4/2013 | Singh | |
| 2017/0009487 | A1 | 1/2017 | Chang | |

FOREIGN PATENT DOCUMENTS

| | | |
|---|---|---|
| EP | 2543796 | 1/2013 |
| FR | 2400100 | 3/1979 |
| FR | 2560918 | 9/1985 |
| FR | 2978977 | 2/2013 |
| WO | 2014152187 | 9/2014 |

* cited by examiner

ELECTRIC STRIKE INCLUDING A BIASING MECHANISM FOR A KEEPER SUPPORT BRACKET

CROSS-REFERENCE TO RELATED APPLICATIONS

This application is a continuation of U.S. patent application Ser. No. 17/222,399, filed Apr. 5, 2021, now U.S. Pat. No. 11,761,242, which is a continuation-in-part of U.S. patent application Ser. No. 17/161,149, filed Jan. 28, 2021, which in turn is a continuation of U.S. patent application Ser. No. 15/098,041, filed Apr. 13, 2016, now U.S. Pat. No. 10,934,744, which in turn claims the benefit of U.S. Patent Application No. 62/147,468, filed Apr. 14, 2015, the contents of which are hereby incorporated by reference in their entirety.

TECHNICAL FIELD

The present invention relates to strike mechanisms for electrically locking or unlocking a door in a frame; more particularly, to such strike mechanisms wherein a keeper support bracket is moveable between blocking and unblocking positions to selectively allow a keeper to be placed from a locked position and an unlocked position to allow a latch to be released from the strike; and most particularly, to a biasing mechanism including dual opposing springs that impose approximately a zero net force on the keeper support bracket when in the locked position.

BACKGROUND OF THE INVENTION

As is known in the art of door latching, typically an electrically-controlled strike is mounted in a frame portion of a door and engages a lockset disposed on or in an edge portion of the door. Typically, the lockset includes a latch, and possibly a dead latch. In the case of a mortise-type lockset, the dead latch is linearly spaced-apart from the latch along the edge portion of the door. In either lockset type, the latch is reciprocally moveable between an engaged position so that it can engage an entry chamber in the strike, thereby to secure the door in a closed state, and a released position, wherein the latch is permitted to exit the entry chamber and to release the door from the closed state and is free to open. Similarly, if included, the dead latch is reciprocally moveable between an enabling position (extended) that permits movement of the latch from its engaged position to the released position and a disabling position (depressed) that prohibits movement of the latch from its engaged position to its release position. Typically, the latch is resiliently biased into the engaged position and the dead latch is resiliently biased into the enabled position.

U.S. Pat. No. 6,581,991 B2, the relevant disclosure of which is incorporated herein by reference, discloses an electrically-controlled strike comprising a housing adapted to be mounted in a frame portion of a door and having a cavity with a forwardly disposed opening that is sized and adapted to receive a spring latch and a dead latch when the door is in the closed state. The invention provides a single electrically actuated door latch structure that can be customized to a variety of spring latch and dead latch arrangements.

U.S. Pat. No. 9,183,976, assigned to Hanchett Entry Systems, Inc., discloses a springless electromagnet actuator having a mode selectable magnetic armature that may be used in door latching applications. A standard solenoid body and coils are combined with a non-magnetic armature tube containing a permanent magnet, preferably neodymium. The magnet is located in one of three positions within the armature. When biased toward the stop end of the solenoid, it may be configured to act as a push solenoid. When biased toward the collar end of the solenoid, it may be configured to act as a pull solenoid. In either case, no spring is required to return the armature to its de-energized position. Positioning the magnet in the middle of the armature defines a dual-latching solenoid requiring no power to hold it in a given state. In one aspect, positive coil pulse may move the armature toward a stop end, whereas a negative coil pulse moves the armature toward a collar end. The armature will remain at the end to which it was directed until another pulse of opposite polarity is supplied to the actuator.

International Patent Publication No. WO 2014/152187, the relevant disclosure of which is incorporated herein by reference, discloses a circuit, apparatus and method for improving energy efficiency, reducing cost and/or improving quality of electronic locks. The electronic lock controller circuit includes an input for receiving a legacy pulse, a power circuit for extracting power from the legacy pulse to power the electronic lock controller circuit, a detector circuit for detecting a polarity of the legacy pulse and a microcontroller having an output for connection to a lock actuator. The microcontroller sends an output pulse via the output to control the lock actuator and the output pulse having reduced power as compared to the legacy pulse at the input. The power may be reduced by reducing voltage and/or reducing the duration of the voltage pulse.

What is needed in the art is an interchangeable actuator module wherein each module may include a user-selected and/or condition-dependent actuator, such as, for example, a standard solenoid, a low power springless solenoid or a motor such as a low power stepper motor actuator. Such modules may further be configured to reside within strike housings having different depths depending upon the size/type of latch assembly being used.

It is an aspect of the present invention to reduce the cost and complexity of an electrically-controlled strike for a door with a mortise lockset and to improve reliability of operation. Another aspect of the present invention is to decrease the time in which a stepper motor-controlled electric strike is moved from a locked state to an unlocked state to allow a door to be moved to an opened state in a timely manner.

SUMMARY OF THE INVENTION

Briefly described, one aspect of the present invention is directed to an interchangeable, unitized actuator module for an actuator-controlled electric strike, for operating in conjunction with a latch of a mortise-type or cylindrical-type lockset, wherein the latch has an engaged position so as to selectively secure a door in a closed state. The electric strike may comprise a housing including a back wall and opposing side walls defining an entry chamber therein. A keeper is rotatably disposed in the entry chamber about an axis for rotation between a locked position and an unlocked position. The interchangeable actuator module may include a body, at least one keeper release and an actuator selectively movable between a first actuator position and a second actuator position. The actuator is unitized in that the actuator is contained within the body and at least a portion of the keeper release is contained within the body. The actuator may in turn include an actuating device, which may be a solenoid or a motor, and a keeper support bracket and a keeper support. The keeper release engages the keeper support which extends downwardly from the keeper support bracket. The support bracket may include an actuator extension that is configured to mount onto or otherwise engage a plunger of the activating device. In the case of a pull type solenoid operating in a fail secure mode, actuation of the solenoid upon receiving power via leads extending out of the module causes the plunger to be pulled into the body of the solenoid. As the keeper support bracket is engageable with the plunger via an actuator extension, the inward travel of the plunger pulls with it the keeper support bracket. The keeper support is likewise displaced by travel of the keeper support bracket such that the keeper support is no longer operatively coupled to the keeper release. Thus, with the solenoid plunger retracted, any load on the keeper (such as an authorized attempt to withdraw a latch from the entry chamber of the housing) pivots the keeper so that the keeper drives the keeper release toward a back wall of the housing against a biasing member. Once any load on the keeper is removed, the keeper is returned to its locked position by its own biasing member while the keeper release is returned to the extended position via its biasing member. In this manner, once power to the solenoid has been cut off, the plunger returns to its original extended position, such as via a plunger return spring. In turn, the keeper support bracket and keeper support return to their original positions so as to lock the keeper.

In accordance with another aspect of the invention, a unitized, interchangeable actuator module is provided as described above, so that an existing electric strike may be readily retrofitted with a replacement actuator module.

In accordance with a further aspect of the invention, the unitized actuator module is configured to interchangeably reside within housings having entry chambers of differing depth.

In accordance with another aspect of the present invention, the keeper release and the keeper support are configured such that a load placed on the keeper when the latch is in the engaged position and the keeper is in the locked position is transferred from the keeper through the keeper release and keeper support to the back wall of the housing.

In accordance with a further aspect of the present invention, the actuating device may comprise a spring return solenoid and a plunger, wherein the keeper release is operatively coupled to the plunger and configured for sliding movement when the actuating device moves between a first and second actuator positions.

In accordance with yet another aspect of the invention, the actuating device may comprise a stepper motor including a shaft. The keeper release is coupled to the shaft and configured for sliding movement when the stepper motor moves between a first and second actuator positions. The actuator module may also include a microcontroller configured to sense a voltage having a first polarity supplied to the stepper motor wherein, upon sensing the voltage having the first polarity the microcontroller drives the stepper motor from the first to the second actuator position. The actuator module may further include a constant-current, constant-voltage (CCCV) charger and a super capacitor, the microcontroller controlling the CCCV charger to charge the super capacitor after the stepper motor has been driven to the second actuator position, the super capacitor being used to provide a second voltage having a polarity opposite the first polarity to selectively drive the stepper motor from the second actuator position to the first actuator position.

In accordance with another aspect of the invention, the actuating device may comprise a springless electromagnet actuator, wherein the keeper release is coupled to the plunger and configured for sliding movement when the actuating device moves between the first and second actuator positions. The actuator module may also include a microcontroller configured to sense a voltage having a first polarity supplied to the actuating device wherein, upon sensing the voltage having the first polarity the microcontroller drives the springless electromagnet actuator from the first to the second actuator position. The actuator module may further include a constant-current, constant-voltage (CCCV) charger and a super capacitor, the microcontroller controlling the CCCV charger to charge the super capacitor after the springless electromagnet actuator has been driven to the second actuator position, the super capacitor being used to provide a second voltage having a polarity opposite the first polarity to selectively drive the springless electromagnet actuator from the second actuator position to the first actuator position.

In accordance with another aspect of the present invention, the housing is configured to receive one of a plurality of strike plates, wherein each of the plurality of strike plates are configured to accommodate different types of locksets.

In accordance with another aspect of the present invention, the keeper includes an extendable face portion in communication with the entry chamber, the extendable face portion being adjustable to define a width of the entry chamber. The extendable face portion may be adjusted to an infinite number of positions using a set screw.

In accordance with a further aspect and non-limiting exemplary embodiment of the present invention, an actuator-controlled electric strike may be provided for operating in conjunction with a latch and deadbolt of a lockset, wherein the latch has an engaged position so as to secure a door in a closed state and a released position. The strike may comprise a housing including a longitudinal length, a back wall extending along the housing longitudinal length, and upstanding side walls defining an entry chamber therein. The strike may further comprise a keeper disposed in the entry chamber about an axis of rotation parallel with the back wall, wherein the keeper is rotatable about the axis of rotation between a locked position and an unlocked position. The back wall is disposed opposite the keeper when the keeper is in the locked position. The strike may further comprise a deadbolt bracket adjustably positioned in the entry chamber along the housing longitudinal length. The deadbolt bracket includes a first wall, a second wall, and a bracket side wall connecting the first wall and the second wall, wherein the deadbolt bracket defines at least a portion of a deadbolt receiving chamber for the deadbolt.

In another exemplary, non-limiting embodiment, the first wall includes a first distal end, and the second wall includes a second distal end, and the first and second distal ends are disposed against one of the side walls of the housing, and wherein the deadbolt bracket and the one of the side walls define the deadbolt receiving chamber for the deadbolt. Further, the deadbolt bracket may include a tab extending from at least one of the first and second distal ends, and one of the side walls of the housing has a slot defined therein configured to receive the tab.

In yet another exemplary, non-limiting embodiment, the first wall includes a first distal end, the second wall includes a second distal end, and the first and second distal ends are disposed against the back wall of the housing, wherein the deadbolt bracket and the back wall define the deadbolt receiving chamber for the deadbolt. Further, the deadbolt bracket may include a tab extending from at least one of the first and second distal ends, wherein the back wall of the housing has a slot defined therein configured to receive the tab.

In accordance with yet a further aspect of the present invention, the housing is configured to receive a latch bolt monitor, wherein the housing is configured to receive the latch bolt monitor in the entry chamber. The housing may include a back wall, wherein the latch bolt monitor is mounted to the back wall.

In accordance with another aspect of the invention, the strike may further include a trim plate disposed around the keeper, wherein the trim plate is mounted to one of the housing of the strike or a door frame.

In accordance with yet another aspect of the invention, a lip extension may be fitted to the electric strike in order to for the electric strike to be used with a wider, non-standard door frame. The lip extension may include a bottom panel, a first side wing, and a second side wing, wherein the first side wing extends from a first end of the bottom panel, wherein the second side wing extends from a second end of the bottom panel, and wherein the lip extension is mounted to the housing. The lip extension may include a rib disposed on the bottom panel that extends between the first side wing and the second side wing, wherein the rib is disposed adjacent to a notch formed in the housing. At least one of the first side wing and the second side wing may include a notch defined in a distal end that is configured for being disposed adjacent to a strike plate mounted to the housing. The bottom panel of the lip extension may be positioned adjacent to a bottom panel of the housing. Further, the lip extension may be U-shaped.

In accordance with another aspect of the invention, the housing may include a back panel, a bottom panel and opposing side walls to define the entry chamber, and at least one of the sidewalls includes an edge. The keeper may include a keeper base and a ramp element, wherein the ramp element includes a surface that is contactable by the latch, and wherein the surface of the ramp element extends beyond the edge of the at least one of the side walls when the keeper is in the locked position to prevent the latch from contacting the edge of the at least one of the side walls. A profile of the surface of the ramp element may be configured to match a profile of the edge of the at least one of the side walls. For example, the surface of the ramp element includes a rounded profile.

In another aspect, the surface of the ramp element may include an extension flange that covers the edge of the at least one of the side walls when the keeper is in the locked position.

In another aspect of the invention, the ramp element may include a surface contactable by the latch wherein the surface extends beyond a front profile of the housing to prevent the latch from contacting an edge of a side wall of the housing.

In another aspect, the housing may include a front profile, and the keeper may include a keeper base and a ramp element. The ramp element includes a surface that is contactable by the latch, and the surface of the ramp element extends beyond the front profile of the housing when the keeper is in the locked position to prevent the latch from contacting the edge of the at least one of the side walls. In still a further aspect of the present invention, a method is provided for locking or unlocking a door having an actuator-controlled electric strike for operating in conjunction with a latch of a lockset is included, wherein the latch has an engaged position so as to secure a door in a closed state and a released position, and wherein the strike includes a housing including a back wall and opposing side walls and defining an entry chamber therein; a keeper rotatably disposed in the entry chamber about an axis for rotation between a locked position and a unlocked position; and an actuator module including a keeper release configured to engage the keeper and an actuator selectively movable between a first actuator position and a second actuator position, wherein when the actuator is in one of the first or second actuator positions the keeper release is coupled to the keeper to secure the keeper in the locked position, and wherein when the actuator is selectively moved to the other of the first or second actuator positions the keeper release is decoupled from the keeper and the keeper is rotatable to the unlocked position, the method for unlatching comprising the steps of: providing an input voltage to drive the actuator from the first actuator position to the second actuator position; after driving the actuator to the second actuator position, using the input voltage to charge a capacitor; removing the input voltage; and providing a return voltage via the capacitor to drive the actuator from the second actuator position to the first actuator position.

In yet a further aspect of the invention, a method for changing a unitized actuator module of a strike assembly is provided wherein the actuator module is a first actuating module including a body, an actuator and a keeper release, the method comprising the steps of: a) providing the strike assembly having a housing, wherein the first actuator module is disposed in the housing, and a keeper movably disposed in the housing. The first actuator module includes a first body, a first actuating device comprising one of a solenoid or a motor, and a first keeper release operatively engageable with said movable keeper to selectively release said keeper from a locked position to a released position; b) allowing for the removal of the first actuator module from the housing; and c) allowing for the installation of a second actuator module in place of the first removable actuator module wherein the second actuator module includes a second actuating device comprising one of a solenoid or a motor, and further comprising a second keeper release operatively engageable with the movable keeper to selectively release the keeper from the locked position to the released position.

In a further aspect of the present invention, a method may include having the actuator module include a microcontroller, wherein the microcontroller senses an input polarity of the input voltage and drives the actuator from the first actuator position to the second actuator position. Further, the capacitor may be a super capacitor, and the actuator module may further include a constant-current, constant-voltage (CCCV) charger. The microcontroller controls the CCCV charger to charge the super capacitor after the actuator has been driven to the second actuator position, wherein the super capacitor provides a second voltage having a polarity opposite the input polarity to drive the actuator from the second actuator position to the first actuator position.

In a further aspect of the present invention, an actuator-controlled electric strike for operating in conjunction with a latch of a lockset is provided. The latch has an engaged position so as to secure a door in a closed state and a released position. The strike comprises a housing defining an entry chamber therein, a keeper disposed in the entry chamber, wherein the keeper is movable between a locked position and an unlocked position, and a keeper support bracket movable between a first position and a second position. When the keeper support bracket is in the first position, the keeper is in one of the locked position or the unlocked position, and wherein when the keeper support bracket is in the second position the keeper is in the other of the locked position or the unlocked position. The strike further comprises an actuating mechanism operatively connected to the keeper support bracket, wherein the actuating mechanism is actionable in a first direction to move the keeper support bracket toward the first position, and wherein the actuating mechanism is configured to allow the keeper support bracket to move in a second direction toward the second position, wherein the second direction is different than the first direction. The strike further includes a biasing member applying a net force to the keeper support bracket, wherein the biasing member comprises a first biasing mechanism and a second biasing mechanism. The first biasing mechanism has at least one biasing characteristic value different from that of the second biasing mechanism. The first biasing mechanism applies a first force to the keeper support bracket in the first direction, and the second biasing mechanism applies a second force to the keeper support bracket in the second direction, wherein when the keeper support bracket is in the first position, the net force of the biasing member applied to the keeper support bracket is approximately zero.

In a further aspect, the keeper support bracket may include an actuator extension that is operatively coupled to the actuating mechanism, wherein the keeper support bracket is selectively moveable by the actuating mechanism between the first position and the second position. The actuating mechanism may be a stepper motor, and a keeper release may be operatively coupled between the keeper support bracket and the keeper. The strike may further include a carrier operatively connected between the actuating mechanism and the keeper support bracket, wherein the carrier may be formed of a polyether ether ketone polymer. Furthermore, the stepper motor may include a lead screw having a screw thread, and the motor carrier may include a carrier thread mateable with the screw thread, wherein when the stepper motor is actionable in either the first direction or the second direction, the motor carrier acts upon the keeper support bracket to move the keeper support bracket between the first position and the second position.

In another aspect, the present invention includes a method of improving the performance of an electric strike. The electric strike includes a keeper movable between a locked position and an unlocked position, and a support bracket movable by an actuating mechanism actuator between a first position and a second position. When the support bracket is in the first position the keeper is in one of the locked position or the unlocked position, and wherein when the support bracket is in the second position the keeper is in the other of the locked position or the unlocked position. The method comprises the steps of: a) providing a first biasing mechanism operatively coupled to the support bracket to apply a first force in a first direction to move the support bracket toward the first position, wherein the first biasing mechanism includes a first characteristic value; b) providing a second biasing mechanism operatively coupled to the support bracket to apply a second force in a second direction opposite the first direction to move the support bracket toward the second position, wherein the second biasing mechanism includes a second characteristic value that is different than the first biasing characteristic value; and c) selecting the first and second spring constants so that a net force exerted on the support bracket by the first and second biasing mechanisms is approximately zero when the support bracket is in the first position, whereby the performance of the electric strike is improved by increasing an acceleration of the support bracket upon an initial movement of the support bracket toward one of the first position or the second position by the actuating mechanism.

The method may further comprise the step of selecting the first and second spring constants so that a net force exerted on the support bracket by the first and second biasing mechanisms is positive in the first direction applied in the second direction when the support bracket is in the second position.

In yet another aspect, the present invention includes an actuator module for an electric strike for operating in conjunction with a latch of a lockset, wherein the latch has an engaged position so as to secure a door in a closed state and a released position. The electric strike comprises a housing defining an entry chamber and a keeper disposed in the entry chamber about an axis of rotation wherein the keeper is rotatable between a locked position and an unlocked position. The actuator module comprises a keeper support bracket movable between a blocking position and an unblocking position, wherein when the keeper support bracket is in the blocking position, the keeper is held in the locked position, and when the keeper support bracket is in the unblocking position the keeper is able to be moved to the unlocked position. The actuator module also includes an actuating mechanism operatively connected to the keeper support bracket and actionable in a first direction to move the keeper support bracket toward the blocking position, and actionable in a second direction to move the keeper support bracket toward the unblocking position, wherein the second direction is different than the first direction. The actuator module further includes a biasing member applying a net force to the keeper support bracket. The biasing member comprises a first biasing mechanism and a second biasing mechanism. A first biasing characteristic value of the first biasing mechanism is different than a second biasing characteristic value of the second spring. The first biasing mechanism applies a first force to the keeper support bracket in the first direction, and the second biasing mechanism applies a second force to the keeper support bracket in the second direction. When the keeper support bracket is in the blocking position, the net force of the biasing member is approximately zero.

In another aspect, the present invention includes a method of improving the performance of an actuator module of an electric strike. The electric strike includes a keeper movable between a locked position and an unlocked position. The actuator module includes a support bracket movable by an actuating mechanism between a blocking position and an unblocking position. When the support bracket is in the blocking position the keeper is in the locked position, and when the support bracket is in the unblocking position the keeper is in the unlocked position. The method comprises the steps of: a) providing a first biasing mechanism operatively coupled to the support bracket to apply a first force in a first direction to move the support bracket toward the blocking position, wherein the first biasing mechanism includes a first biasing characteristic value; b) providing a second biasing mechanism operatively coupled to the support bracket to apply a second force in a second direction opposite the first direction to move the support bracket toward the unblocking position, wherein the second biasing mechanism includes a second biasing characteristic value that is different than the first biasing characteristic value; c) selecting the first and second spring constants so that a net force exerted on the support bracket by the first and second biasing mechanisms is approximately zero when the support bracket is in the blocking position, whereby the performance of the actuator module is improved by increasing an acceleration of the support bracket upon an initial movement of the support bracket toward the unblocking position by the actuating mechanism.

Numerous applications, some of which are exemplarily described below, may be implemented using the present invention.

BRIEF DESCRIPTION OF THE DRAWINGS

The present invention will now be described, by way of example, with reference to the accompanying drawings, in which.

Figure 1:
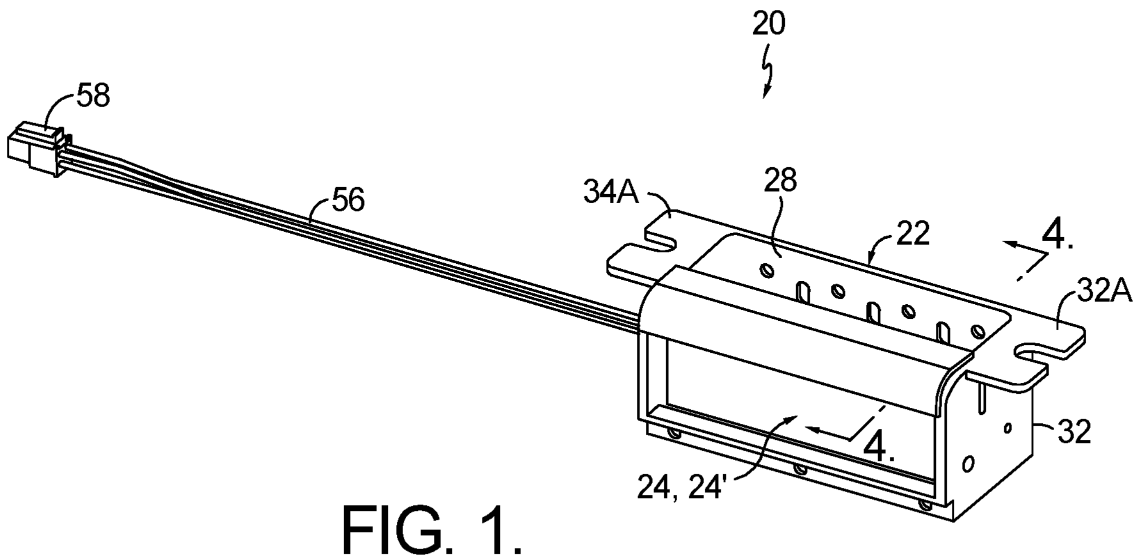
FIG. 1 is a perspective view of an actuator-controlled electric strike in accordance with the present invention.

Corresponding reference characters indicate corresponding parts throughout the several views. The exemplifications set out herein illustrate currently preferred embodiments of the present invention, and such exemplifications are not to be construed as limiting the scope of the invention in any manner.

DESCRIPTION OF THE PREFERRED EMBODIMENTS

Figure 2:
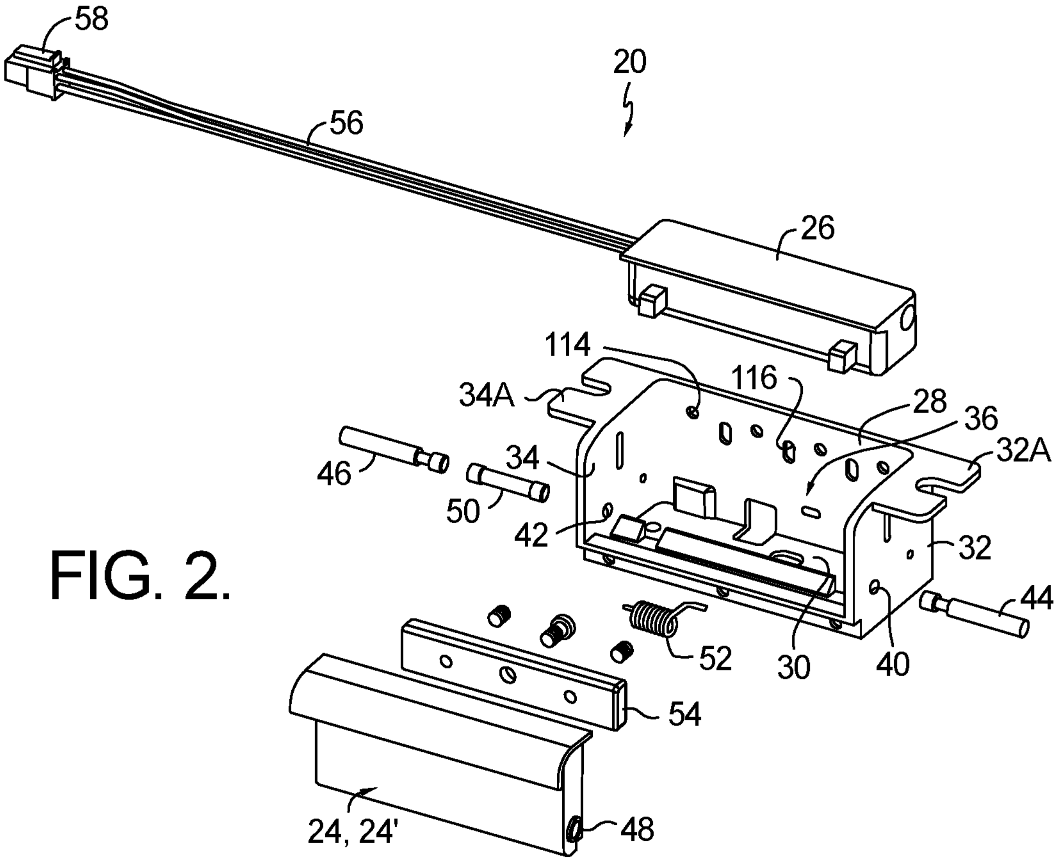
FIG. 2 is an exploded view of the actuator-controlled electric strike shown in FIG. 1.

Referring now to FIGS. 1 and 2, an embodiment of an actuator-controlled electric strike having an interchangeable, unitized actuator module 26, in accordance with the present invention, is generally indicated by reference numeral 20. Strike 20 generally comprises a housing 22 and a keeper 24 rotatably mounted thereto. Unitized actuator module 26 (comprising a body 61 and an actuator 69 and a keeper release 62, wherein actuator 69 is contained within body 61 and at least a portion of keeper release 62 is contained within body 61—see FIG. 5), when inserted into housing 22 as a unit, is configured to cooperate with keeper 24 so as to control locking and unlocking of keeper 24 as will be discussed in greater detail below with specific reference to FIGS. 3-7.

Turning again to FIGS. 1 and 2, housing 22 includes an upstanding back wall 28 disposed opposite keeper 24 when keeper is in a closed position, bottom panel 30 and opposing upstanding side walls 32, 34 thereby defining an entry chamber 36 having a depth (D). See FIG. 3. Side walls 32, 34 may include flanges 32A, 34A for receiving a strike plate 38. See FIGS. 1, 2, 13-17. Side walls 32, 34 may also include apertures 40, 42 configured to receive pivot pin portions 44, 46, respectively. Apertures 40, 42 are positioned so as to coincide with a corresponding through bore 48 passing along a length of keeper 24 such that, upon insertion of pivot pin portions 44, 46, along with spring pin portion 50, keeper 24 is pivotally mounted onto housing 22 and rotatable about an axis X parallel with back wall (see FIG. 4). Spring pin portion 50 is configured to mount a biasing member such as coil spring 52 whereby the coil spring operates to bias keeper 24 toward the closed position, such as that shown in FIGS. 1, 3 and 4. Keeper 24 may further include an extendable face portion 54, integrated with keeper 24, which will be discussed in more detail below with regard to FIGS. 11 and 12. Leads 56 are connected at one end to an actuating device resident within actuator module 26 and extend outwardly from housing 22 wherein a second end 58 is connected to a power supply (not shown) so as to power the actuating device on demand.

Figure 3:
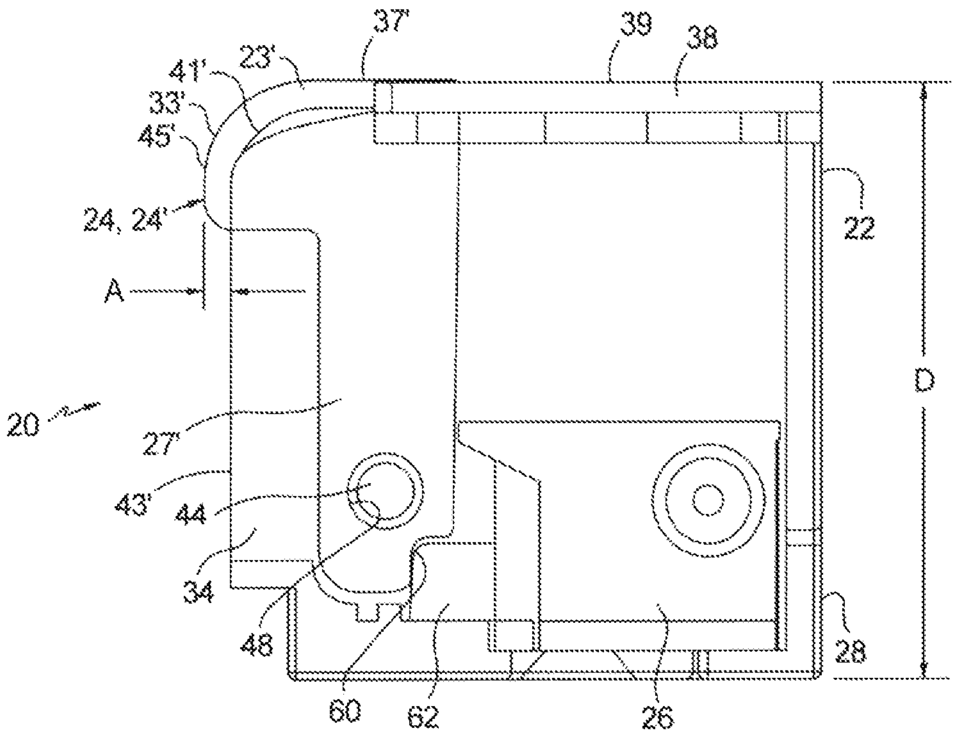
FIG. 3 is a side view of the actuator-controlled electric strike shown in FIG. 1 with the housing shown in phantom view including a strike plate, and the keeper in the locked position.
Figure 4:
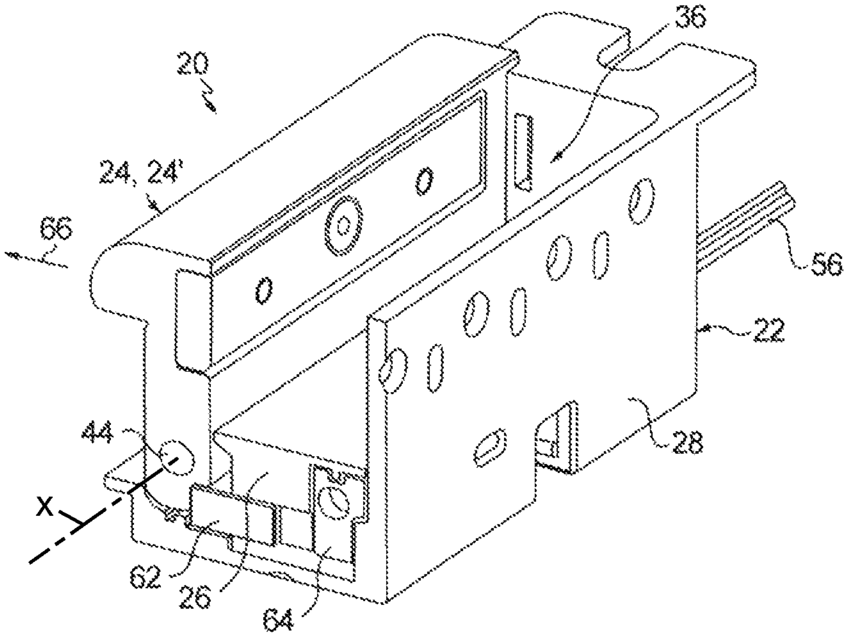
FIG. 4 is a side perspective view of the actuator-controlled electric strike taken along line 4-4 in FIG. 1.
Figure 5:
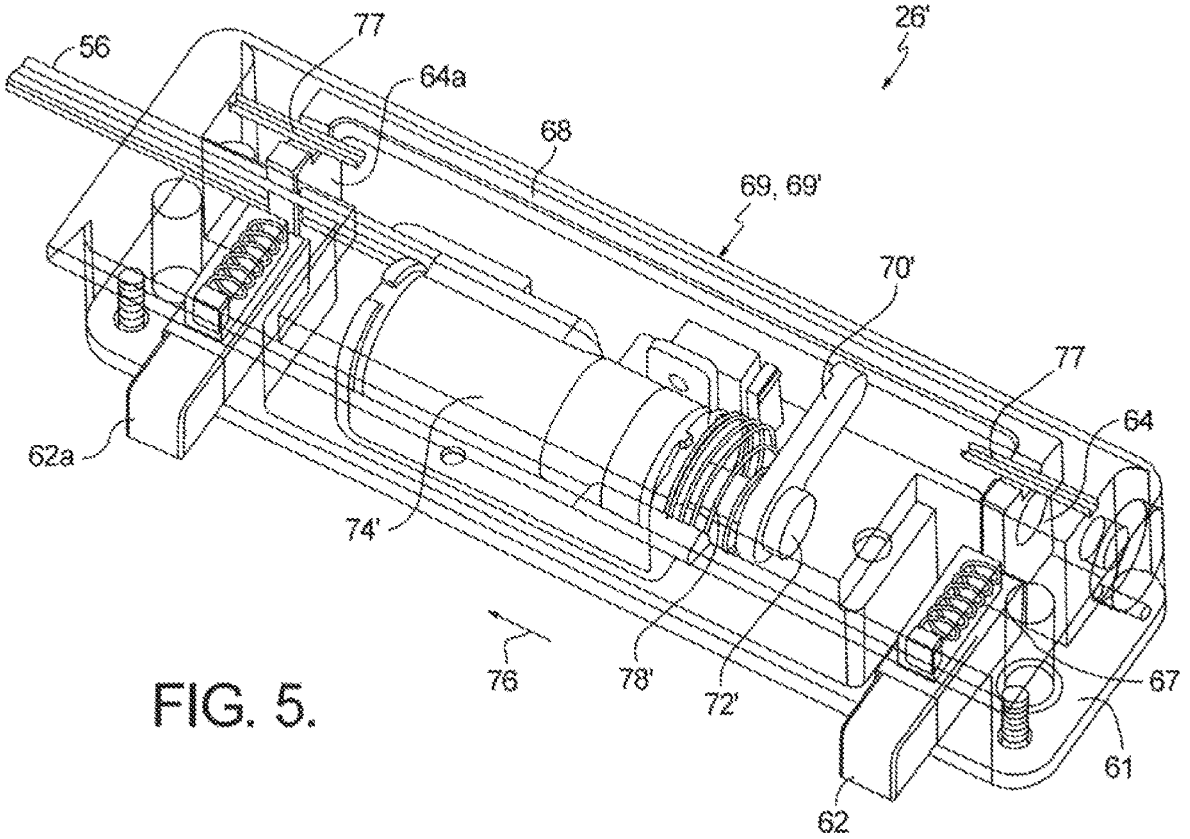
FIG. 5 is a top perspective view of an embodiment of an actuator module used with the actuator-controlled electric strike shown in FIG. 1 wherein the module housing is shown in phantom.
Figure 6:
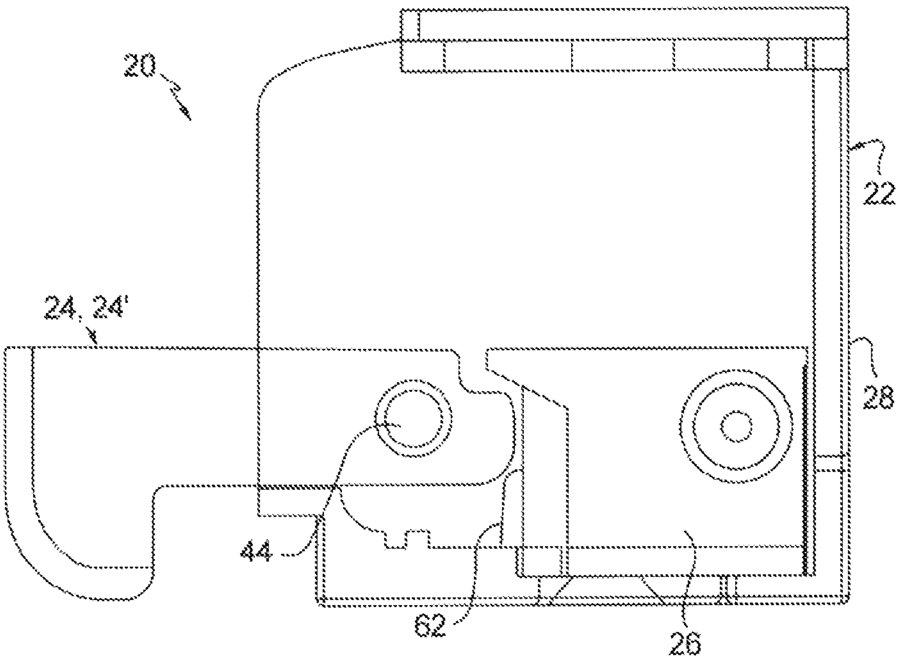
FIG. 6 is a side view of the actuator-controlled electric strike shown in FIG. 1 with the housing shown in phantom view including the strike plate, and the keeper in the unlocked position.
Figure 7:
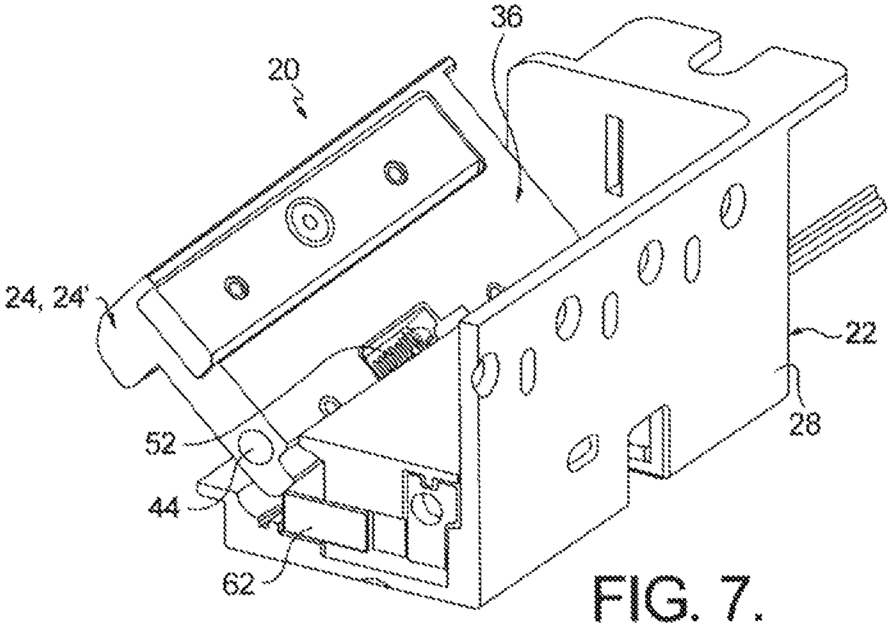
FIG. 7 is a side perspective view of the actuator-controlled electric strike shown in FIG. 6 along the same line as 4-4 in FIG. 1.

FIGS. 3 and 4 show various views of strike 20 with keeper 24 in the closed position and FIG. 5 shows the internal components of an exemplary embodiment 26' of an actuator module that may reside within housing 22. Generally, keeper 24 may include a notched portion 60 at the keeper end proximate through bore 48, the notched portion 60 is configured to engage a keeper release 62 slidably mounted within body 61 of actuator module 26. Keeper release 62, in turn, engages a keeper support 64 of actuator 69 also resident within actuator module 26. In this manner, the keeper is in the locked position such that any load placed on keeper 24 (such as an unauthorized attempt to open a door whose latch is secured within entry chamber 36 in the direction generally indicated by arrow 66—FIG. 4) is transferred from the keeper through the release 62 to the keeper support 64 and ultimately to the back wall 28 of housing 22. A biasing member, such as a coil spring 67, operates to bias keeper release 62 into the extended, locked position shown in FIGS. 3-5.

Referring now to FIG. 5, actuator module 26' includes keeper release 62 and actuator 69'. Actuator 69', in turn, includes an actuating device 74', shown here as a solenoid, and an associated keeper support bracket 68 and keeper support 64. Keeper release 62 engages keeper support 64 which extends downwardly from keeper support bracket 68. Keeper support bracket 68 includes an actuator extension 70' that is configured to mount onto or otherwise engage plunger 72' of solenoid 74'. In the case of a pull type solenoid operating in fail secure mode, actuation of solenoid 74' upon receiving power via leads 56 causes plunger 72' to be pulled into the body of solenoid 74' in the direction generally indicated by arrow 76. As keeper support bracket 68 is engageable with plunger 72' via actuator extension 70', the inward travel of plunger 72' results in a sliding travel of keeper support bracket 68 in direction 76, wherein keeper support bracket 68 may be slidably coupled with a guide 77 that is fixedly positioned relative to body 61. Keeper support 64 is likewise displaced by travel of keeper support bracket 68 such that keeper support 64 is no longer aligned with and operatively coupled to keeper release 62. With additional reference to FIGS. 6 and 7, at this point, any load on keeper 24 (such as an authorized attempt to withdraw a latch from entry chamber 36) operates to pivot keeper 24 about pin portions 44, 46, 50 so that keeper 24 drives keeper release 62 linearly, perpendicular to the axis X and/or toward back wall 28 of housing 22 against biasing member 67. Once any load on keeper 24 is removed (such as after the removal of the door latch), keeper 24 is returned to its locked position by biasing member 52 while keeper release 62 is returned to the extended position via biasing member 67. In this manner, once power to actuating device 74' has been withdrawn, plunger 72' may return to its original position, such as via a plunger return spring 78', to thereby return keeper support bracket 68 and keeper support 64 to their original positions whereby keeper support 64 is again aligned with and operatively coupled to keeper release 62 so as to lock keeper 24.

As further shown in FIG. 5, actuator module 26' may include second keeper release **62*a* disposed at the opposite end of the module. Second keeper release 62*a* cooperates with second keeper support 64*a* of support bracket 68. In accordance with this aspect of the invention, the opposing forces imparted on the keeper when an unauthorized attempt is made to withdraw the latch from the entry chamber are balanced across the length of the keeper and translated evenly through first and second keeper releases 62,62*a*** to the back wall of the housing.

Figure 8:
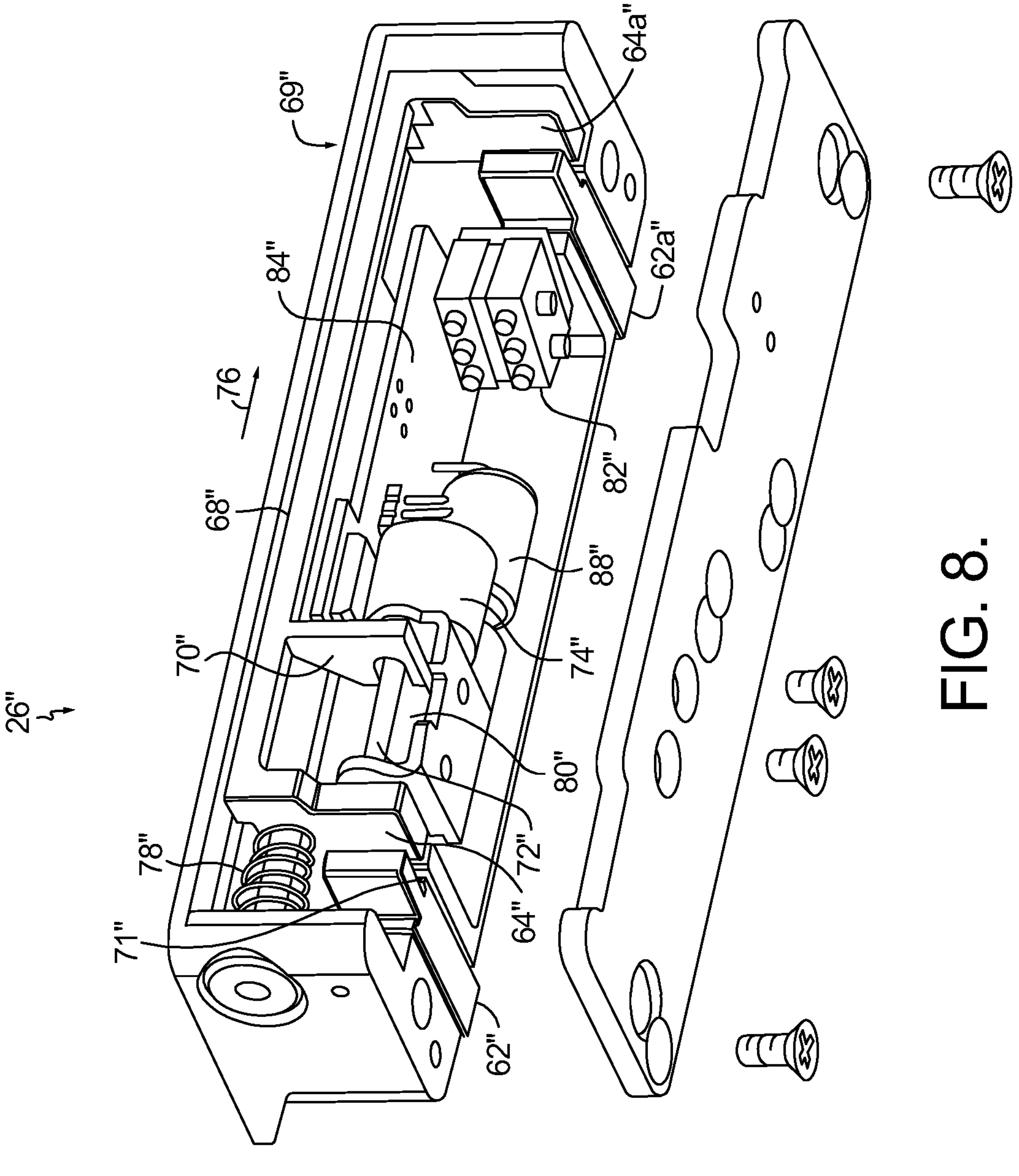
FIG. 8 is a partial exploded bottom perspective view of an embodiment of an actuator module used with the actuator-controlled electric strike shown in FIG. 1.

FIG. 8 shows an alternative actuator module 26", including actuator 69" and keeper release 62". Actuator 69" includes actuating device 74" such as a stepper motor, and keeper support bracket/support, 68", 64", respectively. As shown, keeper support 64" has been disengaged from keeper release 62" so as to allow pivoting of keeper 24 (not shown) to drive keeper release 62" rearwardly (keeper unlocked). To facilitate the sliding translation of keeper support 64", keeper support bracket 68" includes an actuator extension 70" configured to engage with rod 72" on stepper motor 74". Actuation of stepper motor 74" by a voltage having a first polarity causes rotation of shaft 80" so as to advance actuator extension 70" (and keeper support bracket 68" and keeper support 64") in one direction (such as the direction indicated by arrow 76) so as to cause disengagement of keeper support 64" from a rear surface of keeper release 62", such as, for example, shouldered notch 71" of keeper release 62". Supplying a voltage having the opposite polarity then reverses rotation of shaft 80" to advance actuator extension 70" in the opposite direction so as to cause engagement of keeper support 64" with shouldered notch 71". A biasing member, such as spring 78", may assist in driving actuator extension 70" in direction 76 toward stepper motor 74".

As further shown in FIG. 8, actuator module 26" may include second keeper release **62*a*" disposed at the opposite end of the module. Second keeper release 62*a*" cooperates with second keeper support 64*a*" of keeper support bracket 68". In accordance with this aspect of the invention, the opposing forces imparted on the keeper when an unauthorized attempt is made to withdraw the latch from the entry chamber are balanced across the length on the keeper and translated evenly through first and second keeper releases 62",62*a*"** to the back wall of the housing.

Figure 24:
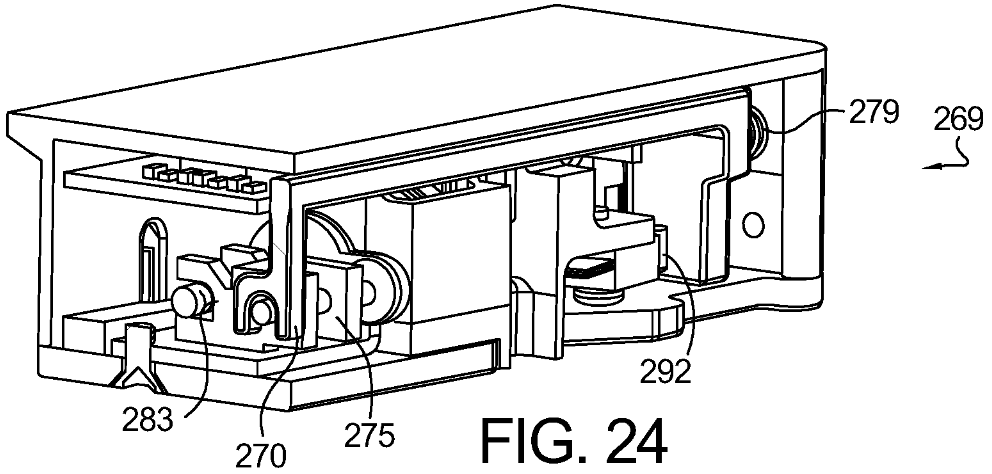
FIG. 24 is a cross-sectional view of the actuator taken along line 24-24 in FIG. 23B.
Figure 22:
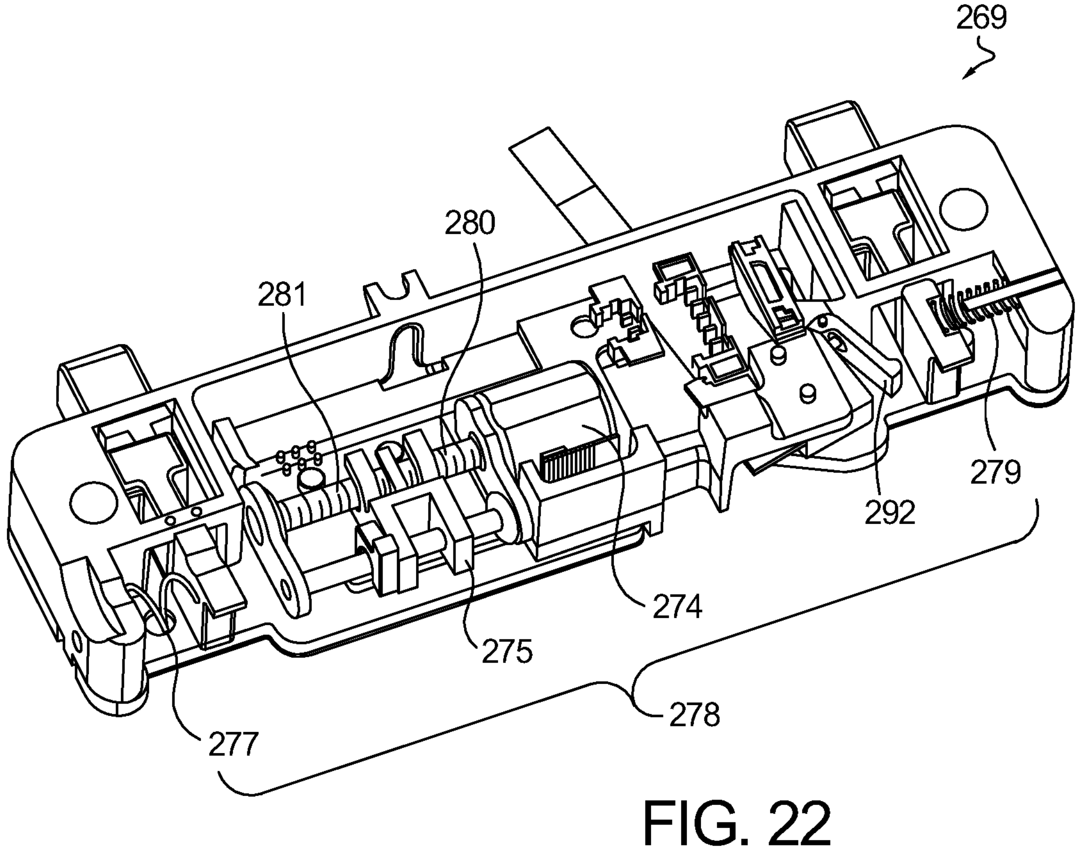
FIG. 22 is a cross-section of a stepper motor driven actuator taken along line 22-22 in FIG. 23B.
Figure 23A:
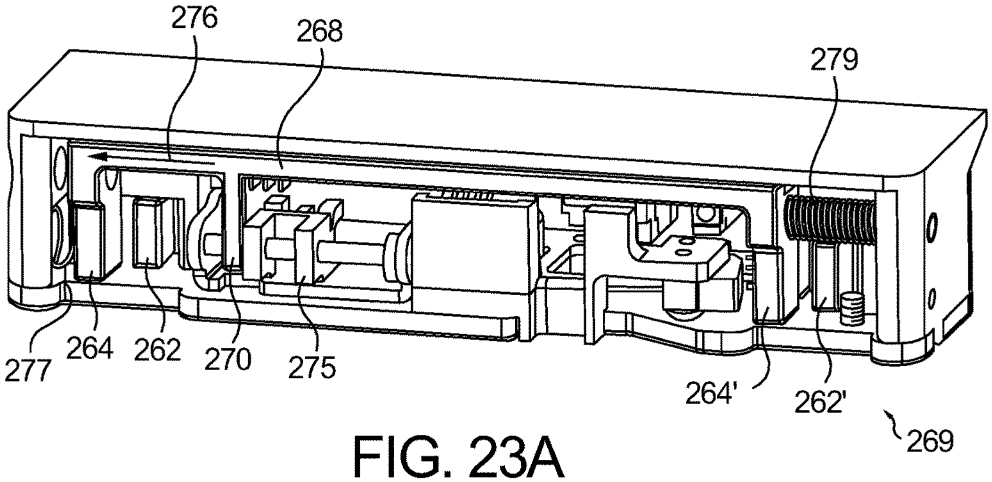
FIG. 23A is a perspective view of the actuator shown in FIG. 23B with a support bracket shown in the unlocked position.
Figure 23B:
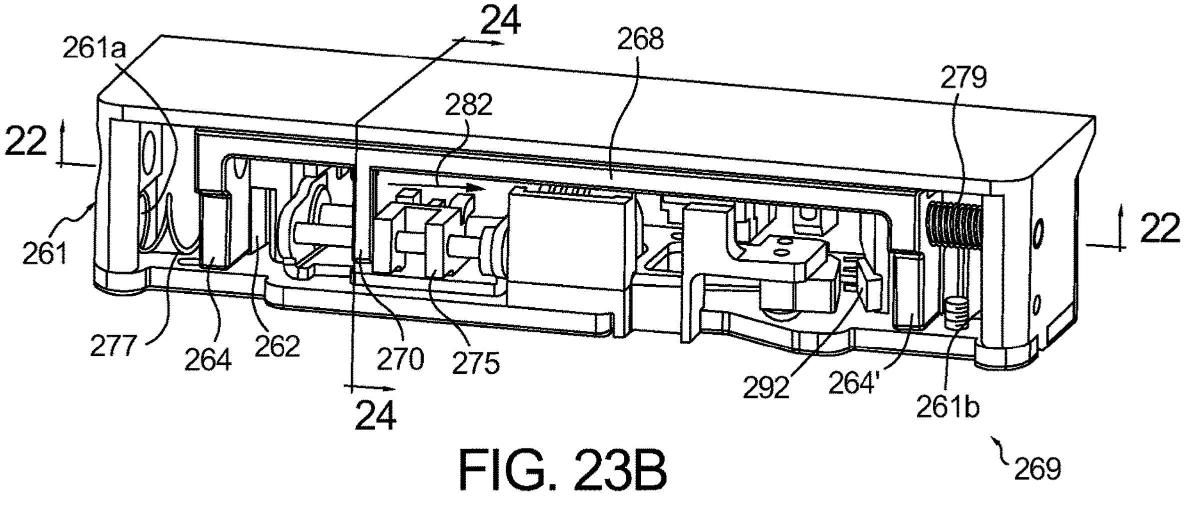
FIG. 23B is a perspective view of the actuator with the support bracket shown in the locked position.

An alternate embodiment of the actuator is shown in FIGS. 22-24 as actuator 269. Actuator 269 may include stepper motor 274, lead screw 280 of stepper motor 274, motor carrier 275, support bracket 268, including keeper support 264 and actuator extension 270, and a pair of opposing springs 277, 279 acting on support bracket 268. As seen in FIG. 23B, spring 277 may be disposed between a side wall **261*a* of body 261 and an outer surface of keeper support 264. Further, spring 279 may be disposed between an opposing side wall 261*b* of body 261 and an outer surface of keeper support 264'. Springs 277 and 279 exert a combined force on support bracket 268 and collectively form biasing member 278. External threads 281 of lead screw 280 matingly engage internal threads 283 of motor carrier 275**.

Actuation of stepper motor 274 by supplying a voltage having a first polarity causes rotation of lead screw 280 so as to advance motor carrier 275 (and actuator extension 270 of keeper support bracket 268 that is in touching contact with motor carrier 275) in a first, keeper unlocking direction shown as arrow 276 in FIG. 23A. Stepper motor 274 may continue to drive towards the unlocked state (FIG. 23A) until a lock state switch 292 is depressed by, for example, an inner surface 294 of keeper support 264'. Note that, in the keeper unlocked state, keeper support 264 is no longer aligned with and operatively coupled to keeper release 262. At this point, the keeper (not shown) is allowed to pivot and to release the latch as described above.

Supplying stepper motor 274 a voltage having the opposite polarity reverses rotation of lead screw 280 to move motor carrier 275 in a second keeper locking direction opposite the first keeper unlocking direction. Upon movement of motor carrier 275 in the second keeper locking direction shown as arrow 282 in FIG. 23B, spring 277 biases actuator extension 270 against motor carrier 275 so as to move support bracket 268 in the second locking direction 282 as well. As shown in FIG. 23B, support bracket 268 has moved to the right (locking direction) so that keeper support 264 is aligned with and operatively coupled to keeper release 262, so as to prevent pivoting of the keeper (not shown) and to prevent release of the latch as described above. At this point, lock state switch 292 is released to indicate that the actuator 269 is in the locked state. If actuator 269 is unable to detect that the lock state switch 292 has been released and has failed to relock, stepper motor 274 may be configured to retry locking at a user configurable rate and/or duration. Further, a notification signal may be communicated, for example, wirelessly, to indicate to an access control system that actuator 269 is unsecure and failed to relock.

As best shown in FIG. 23A, actuator 269 may include second keeper release 262' disposed at the opposite end of actuator 269. Second keeper release 262' may cooperate with second keeper support 264' of keeper support bracket 268.

In the presently described embodiment, the spring constants of springs 277 and 279 are different and configured with respect to keeper support bracket 268 to provide equal but opposing forces on support bracket 268 so that when keeper support bracket 268 is in the position shown in FIG. 23B (keeper locked), the forces exerted by the two springs on keeper support bracket 269 are equal but opposing. At this point, since the forces are equal but opposing, the net lateral force on keeper support bracket 268 to oppose its movement in a direction to unlock the keeper is approximately zero.

Figure 25:
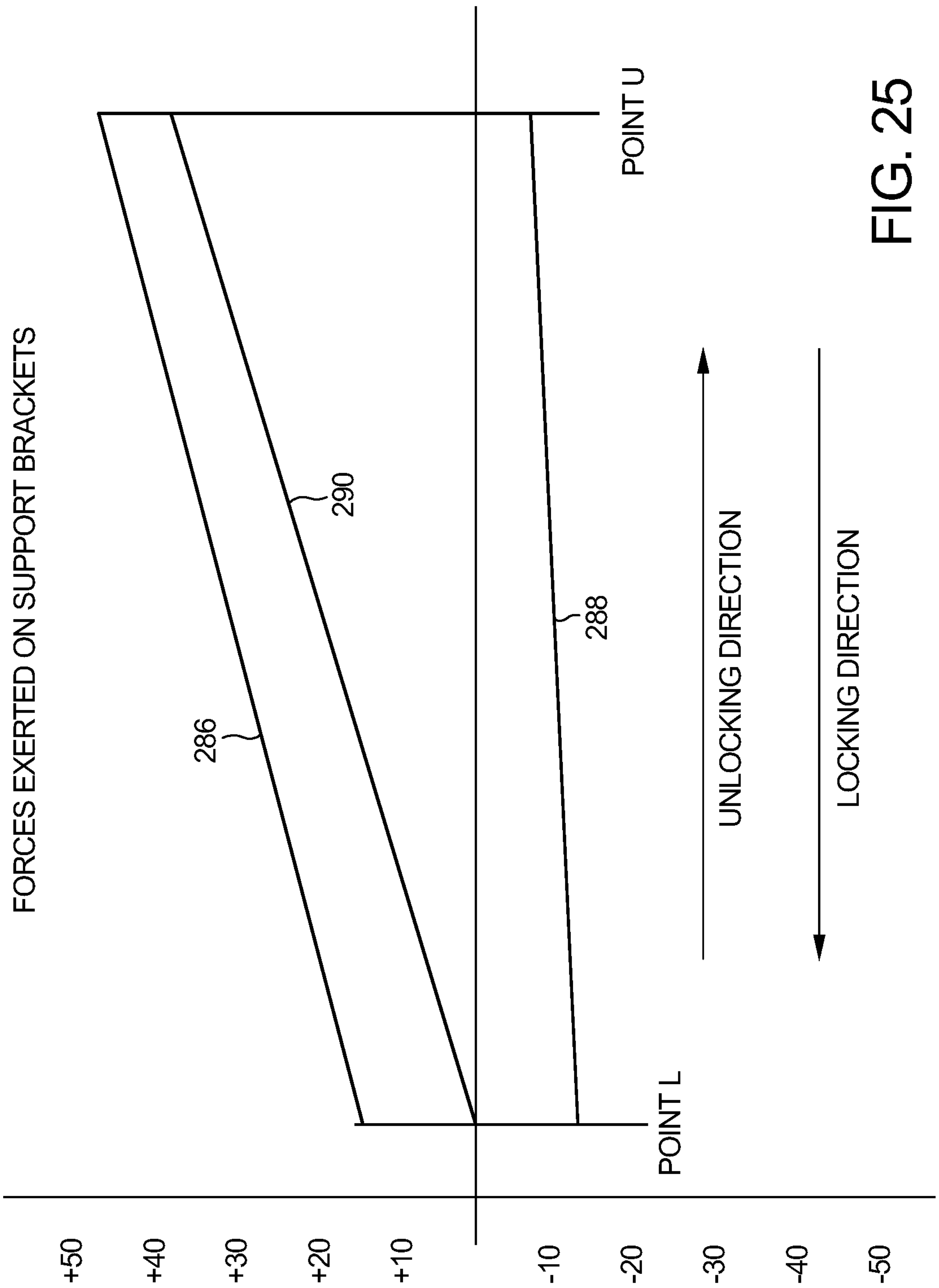
FIG. 25 is a chart showing the forces exerted on the support bracket between the locked position and unlocked position.

As best shown in FIG. 25, the lateral forces exerted on keeper support bracket 268 by springs 277 (line 286) and 279 (line 288) are indicated. In the example shown, when actuator 269 is in its locked state at point L (FIG. 23B), spring 277 is exerting a positive 14.0 g force in direction 282 to hold keeper support 264 in alignment with keeper release 262, At the same time, spring 279 is exerting a 14.0 g force in the opposite direction (direction 276 shown in FIG. 23A). This is represented as a negative 14.0 g force at point L (line 288 in FIG. 25). At point U in FIG. 25, actuator 269 has reached its unlocked state (FIG. 23A) wherein keeper support 264 is not aligned with and not operatively coupled to keeper release 262. In the example shown, spring 277 is exerting a positive 46.0 g force on keeper support 264 in direction 282 when keeper support 264 is in its unlocked state. At the same time, spring 279 is exerting a 9.0 g force on keeper support 264' in the opposite direction to hold actuator 269 in its unlocked state. This is represented as a negative 9.0 g at point U in FIG. 25. Line 290 represents the net lateral force imposed on keeper support bracket 268 by biasing member 278 (composite of springs 277 and 279) as support bracket 268 travels between its keeper locked position L and its keeper unlocked position U. As can be seen in FIG. 25, a 37.0 g force in direction 276 to be imposed by motor carrier 275 on actuator extension 270 in keeper unlocked position U.

Importantly, the net lateral force exerted on support bracket 268 by biasing member 278 is zero in keeper locked position L. This provides for an increase in acceleration of support bracket 268 when actuator 274 is commanded to move the support bracket 268 in the unlocking direction to quickly release the latch from the keeper.

Over time, it is further noted that the internal threads 283 of motor carrier 275 may wear causing the force needed by stepper motor 274 to rotate lead screw 280 and to move support bracket 268 away from position L to increase. The resulting sluggishness of movement of support bracket 268 to in the unlocking direction would counter the advantages bestowed by the embodiment including the dual springs 277, 279 discussed above. To reduce wear of the internal threads, motor carrier 285 may be molded of a wear resistant, high performance engineering plastic such as a polyether ether ketone polymer (PEEK).

In accordance with the embodiment shown in FIGS. 22-25, a method of improving the performance of a strike actuator of an electric strike whereby the acceleration of the support bracket may be increased to quickly unlock the keeper is provided. The electric strike includes a stepper motor actuator, a keeper movable between a locked position and an unlocked position, and a support bracket movable by the stepper motor between a blocking position and an unblocking position. When the support bracket is in the blocking position the keeper is in the locked position, and when the support bracket is in the unblocking position the keeper is in the unlocked position. The method comprises the steps of:

1. providing a first spring operatively coupled to the support bracket to apply a first force in a first direction to move the support bracket toward the blocking position;
2. providing a second spring operative coupled to the support bracket to apply a second force in a second direction to move the support bracket toward the unblocking position, wherein a spring constant of the second spring is different than a spring constant of the first spring;
3. selecting the spring constants so that a net force exerted on the support bracket by the first and second springs is approximately zero when the support bracket is in the blocking position, whereby an acceleration of the support bracket is increased upon an initial movement of the support bracket toward the unblocking position.

A further step may include further selecting said spring constants so that a net force exerted on said support bracket by said first and second springs is approximately is positive in a direction to move said support bracket in its unblocking direction when said support bracket is in its unblocking position.

Figure 9:
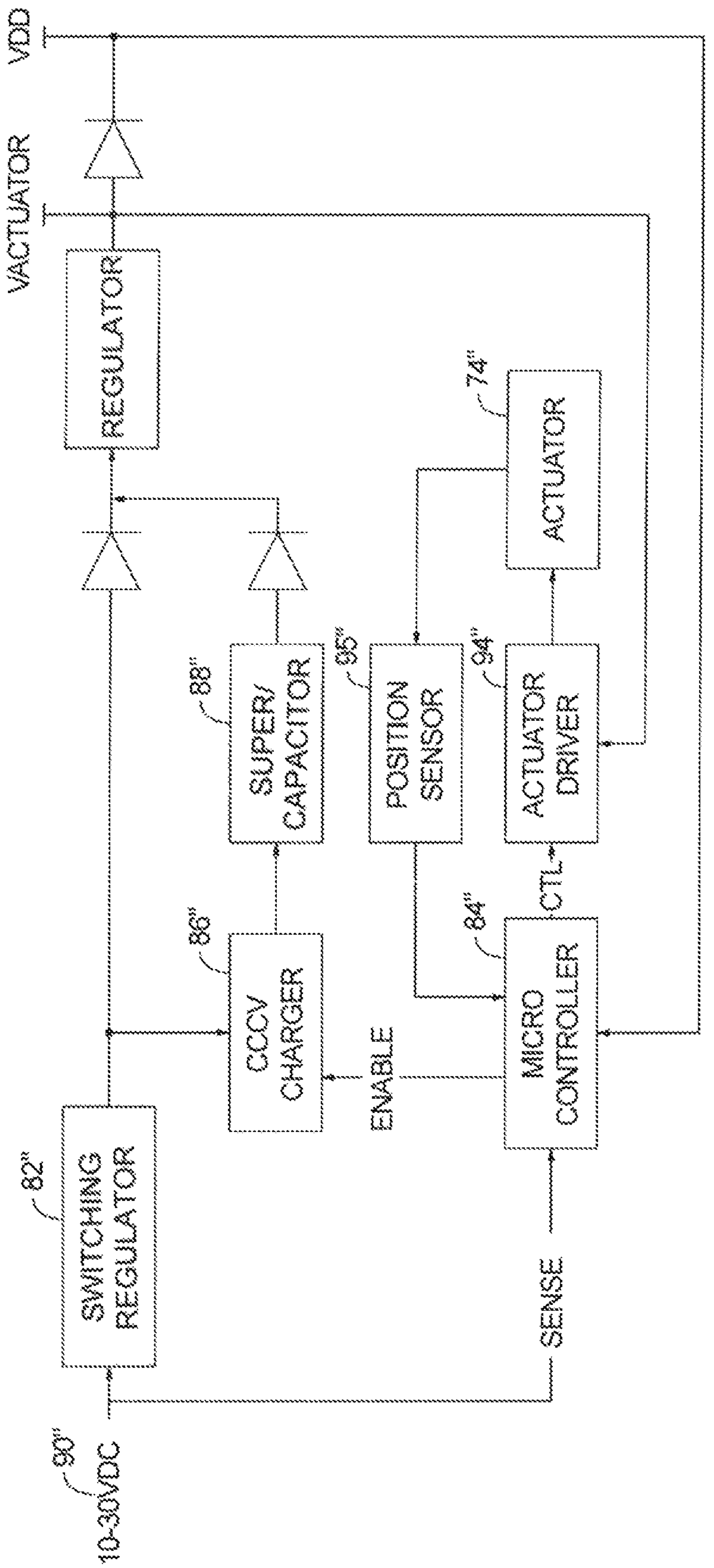
FIG. 9 is a schematic view of actuator circuit for use with an actuator-controlled electric strike in accordance with the present invention.
Figure 10:
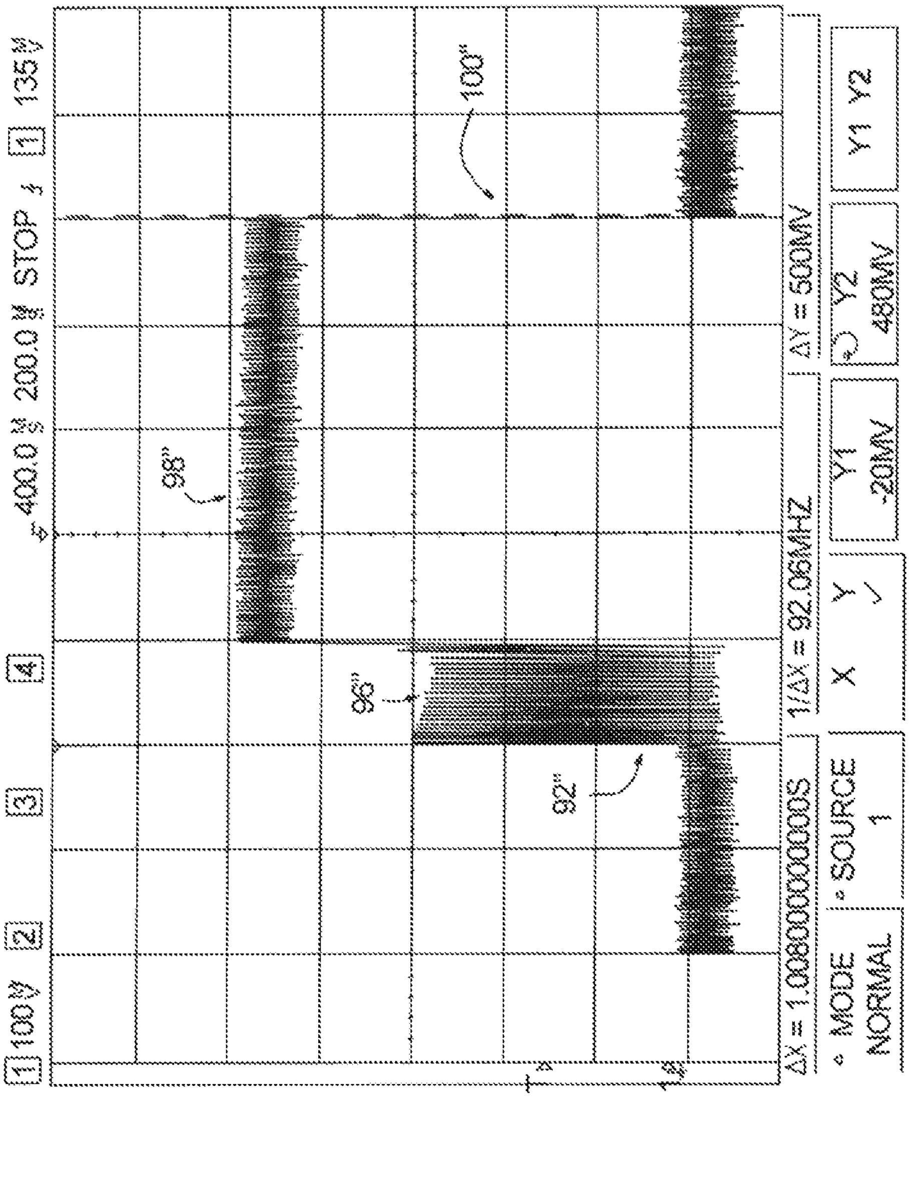
FIG. 10 is a representative current diagram using the circuit shown in FIG. 9.

In accordance with an aspect of the present invention, actuator module 26" may be configured to operate stepper motor 74" as a low power actuator. To that end, and with additional reference to FIGS. 9 and 10, actuator module 26" may further include a switching regulator 82", microcontroller 84", a constant-current constant-voltage (CCCV) regulator 86" and one or more super capacitors 88", such as model no. JUMT1474MED, supplied by Nichicon Corporation of Karasumadori Oike-agaru, Nakagyo-ku, Kyoto, 604-0845 Japan. When external power 90", such as a voltage ranging from about 10 VDC to about 30 VDC, is supplied to actuator module 26", on-board microcontroller 84" senses that power has been supplied (at time 92, FIG. 10) and drives the actuating device, such as stepper motor 74", from a first position to a second position using an actuator motor driver integrated circuit 94" (during time period 96, FIG. 10). After the actuator drive operation has completed, microcontroller 84" enables an onboard CCCV regulator 86" to charge on-board super capacitor(s) 88" (during time period 98, FIG. 10). After a fixed period of time microcontroller 84" disables CCCV regulator 86" (at time 100, FIG. 10). Once external power 90" is removed, microcontroller 84" may power the actuating device 74" using energy stored in super capacitor(s) 88". Actuating device 74" is then driven to return to the first position. In this manner, after charging of super capacitor(s) 88" has been completed, the power consumption of actuator module 22" is reduced. As a further benefit, the use of the controllable CCCV regulator allows for the peak current seen at an external supply output to be limited.

As can be noted from the above, actuator module 26" may be selected to operate in either a fail safe mode or a fail secure mode depending on whether the first position has keeper support 64, 64" coupled to keeper release 62, 62" (fail secure) or whether the first position has members 62/64, 62"/64" decoupled from one another (fail safe). To ensure that the actuator drive operation completes when a pre-load condition is present, a position sensor 95" may be used to supply the microcontroller with actuator position data. In one embodiment, position sensor 95" may be a contactless linear position Hall sensor in conjunction with a magnet. It should be understood that the position sensor may incorporate any suitable sensor system capable of sensing the actuator drive position, such as, but not limited to, a photo sensor, a pressure sensor, a micro switch, a passive infrared sensor, a radio frequency (RF) sensor, a reed switch, or the like. If microcontroller 84" determines the actuator drive was not successfully completed after receiving actuator position data from position sensor, microcontroller 84" will continue to drive the actuator until the desired position is successfully reached. To conserve power, position sensor 95" may be switched to a power down state when it is not being used.

In accordance with a further aspect of the present invention, the actuating device may be a springless electromagnet actuator having a non-magnetic armature containing a permanent magnet combined with a solenoid body and coils similar to that disclosed within U.S. patent application Ser. No. 13/833,671. When using such a springless electromagnet actuator, microcontroller 84" can use input power 90" to provide a first pulse having a first polarity to drive the armature to the second position. Input voltage may then charge super capacitor(s) 88" through CCCV regulator 86" under microcontroller 84" control as described above. Once input power is removed, super capacitor(s) 88" may then provide the power needed for a second pulse having a second polarity to return the armature to the first position.

While the actuating device has been described as either a solenoid, a stepping motor or a springless electromagnet actuator, it is understood the actuating device in accordance with the invention may include other types of motors, including a DC motor, or other types of powered actuating devices, including piezo electric and shape memory devices.

Figure 11:
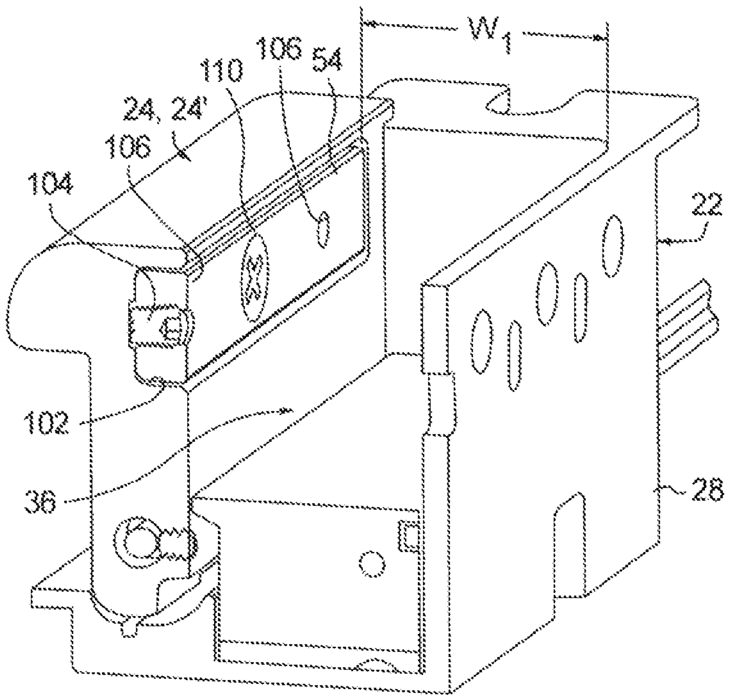
FIG. 11 is a cross sectional perspective view of an actuator-controlled electric strike having an adjustable strike shim in accordance with the present invention with the adjustable strike flush with the keeper.
Figure 12:
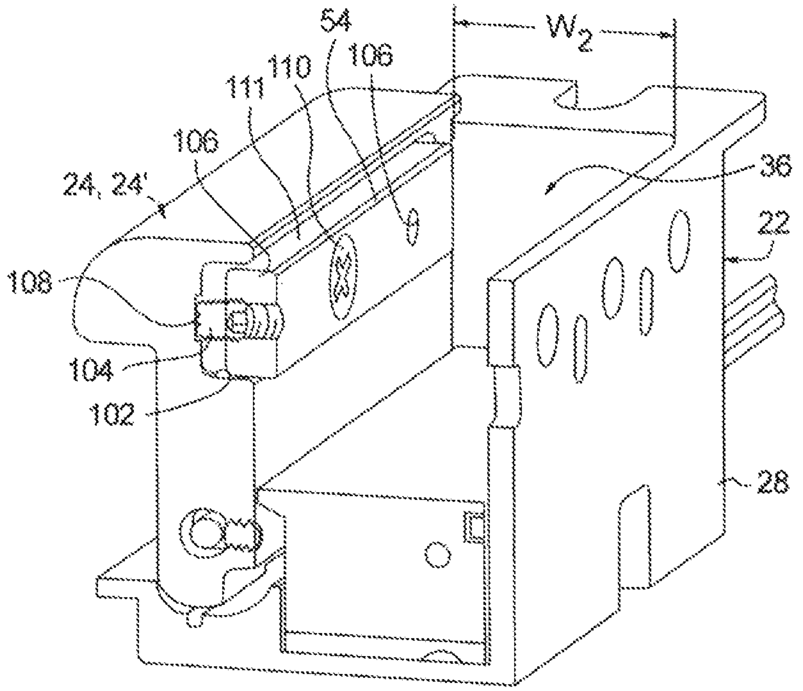
FIG. 12 is a cross sectional perspective view of an actuator-controlled electric strike similar to FIG. 11 having the adjustable strike shim extending inwardly from with the keeper.

Turning now to FIGS. 11 and 12, in accordance with an aspect of the present invention, keeper 24 may be configured to include an extendable face portion 54. Face portion 54 may be positionally adjusted to define the width of entry chamber 36 as measured between the outer face of face portion 54 and the inner surface of back wall 28 of housing 22 (such as from width $W_1$ shown in FIG. 11 to width $W_2$ shown in FIG. 12), thereby minimizing the gapped clearance between an extended latch and the width of the entry chamber.

In accordance with this aspect, keeper 24 may include a groove 102 adapted to received face portion 54. One or more set screws 104 may be threadably inserted within corresponding threaded apertures 106 within face portion 54. Set screws 104 may be selectively advanced until the desire width is created, i.e., width $W_2$. Groove 102 may include respective recesses 108 configured to receive a respective set screw 104. A fastener, such as hex screw 110 is then threaded through face portion 54 and into keeper 24 to secure face portion 54 to the keeper. Width $W_2$ may be selected such there is little movement of the door latch, and subsequently the door, when the latch is locked within strike 20. Reduced movement minimizes unnecessary wear and tear on the latch and the strike, as well as reduces door movement and subsequent noise. In addition, when used in conjunction with a cylindrical-type lockset, and when extendable face portion 54 is adjusted outward and keeper 24 is in its locked position as shown in FIG. 12, surface 111 of extendable face portion 54 may serve as a resting platform for the dead latch of the lockset when the associated latch is received by entry chamber 36. Thus, extendable face portion 54 provides additional assurance that the dead latch remains retracted when the cylindrical lockset is in a locked position, thereby preventing an unauthorized forced retraction of the associated latch to unlock the door. Provision of set screws 104 enables fine incremental control of the placement of face portion 54 over a wide range of entry chamber widths without requiring multiple shim members which are presently employed within the art. Further, in the prior art, a shim pack was provided with the strike product so that, at the time of installation, the width of the entry chamber could be varied as needed, by the selection and installation of the appropriate sized shim to the face of the keeper. However, over time, through usage of the door, the width of the entry chamber can be expected to change, requiring a different sized shim to take up the gapped clearance. Often, the shim pack would be discarded after original strike installation so that a later re-adjustment of the gapped clearance could not be made. In accordance with the invention, the means for re-adjusting the gapped clearance remains with the strike so that re-adjustments can be conveniently made at any time after original installation.

Figure 13:
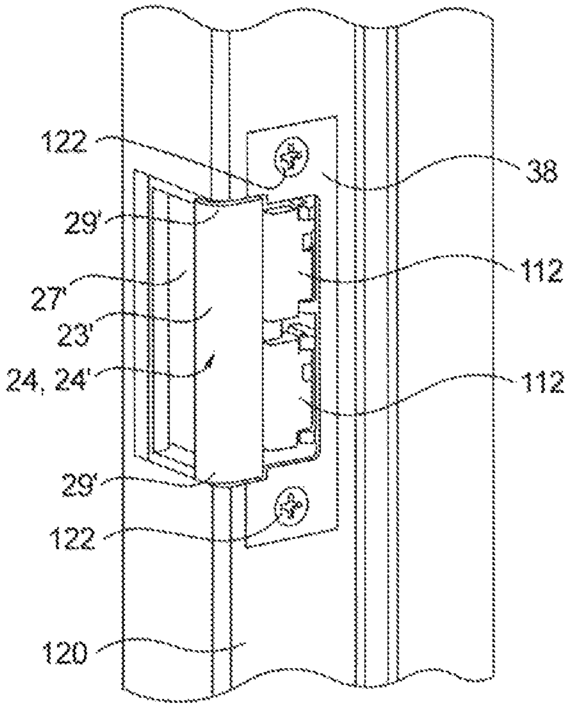
FIG. 13 is a perspective view of an actuator-controlled electric strike including latch bolt monitors in accordance with the present invention.
Figure 14:
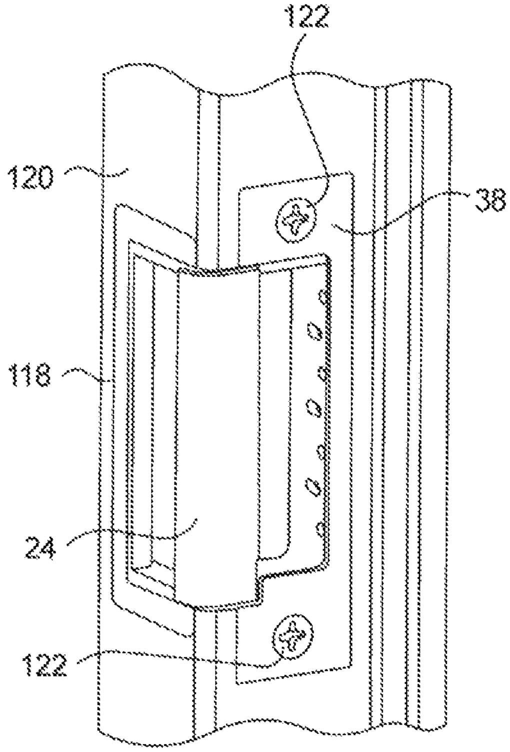
FIG. 14 is a perspective view of an actuator-controlled electric strike including a trim plate in accordance with the present invention.
Figure 15:
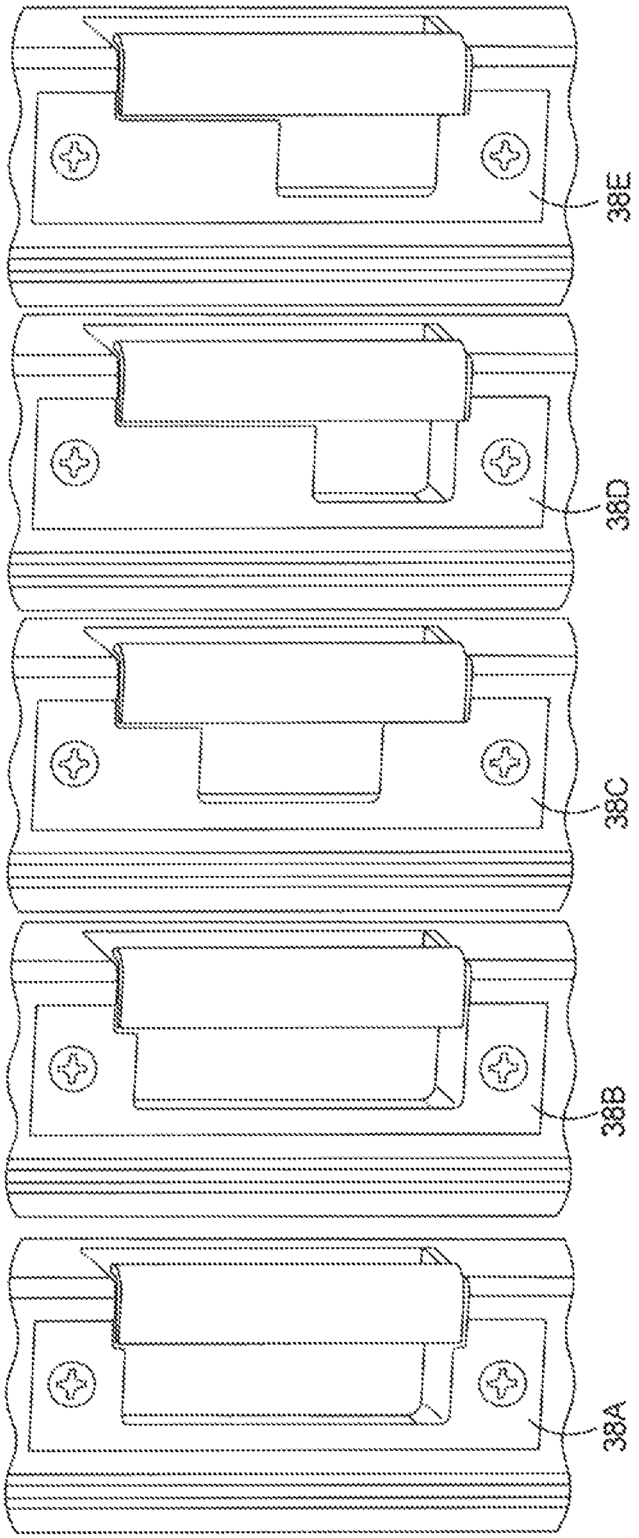
FIG. 15 shows various strike plates that may be used an actuator-controlled electric strike in accordance with the present invention.

FIGS. 13-15 show additional features that may be included with strike 20. For instance, as shown in FIG. 13, strike 20 may be configured to house one or more latch bolt monitors (LBM) 112, which may also be interchangeable across a multitude of electric strike models. LBM 112 may be secured to housing 22 of strike 20 by way of screws or other fasteners inserted through holes 114 defined within back wall 28 of housing 22 (see FIG. 2). Back wall 28 may also include apertures 116 through which wires associated with LBM 112 may be passed for proper operation of LBM 112.

FIG. 14 shows an optional trim plate 118 that may be placed around keeper 24 when strike 20 is mounted to the door frame. Trim plate 118 may be mounted directly to frame 120 or to housing 22. Trim plate 118 may be used to improve aesthetics or may be used to cover any small gaps or cracks between strike 20 and the underlying frame 120.

As seen in both FIGS. 13 and 14, strike 20 may include a strike plate 38 configured to rest against flanges 32A and 34A of respective side walls 32, 34 of housing 22. Strike plate 38 may be mounted to frame 120 via screws 122. As shown in FIG. 15, strike 20 may be configured to receive one of any number of various strike plates, such as anyone of strike plates 38A-38E, depending on the type of latch system mounted onto the door, including a cylindrical-type lockset (see FIG. 38C, for example).

Figure 16:
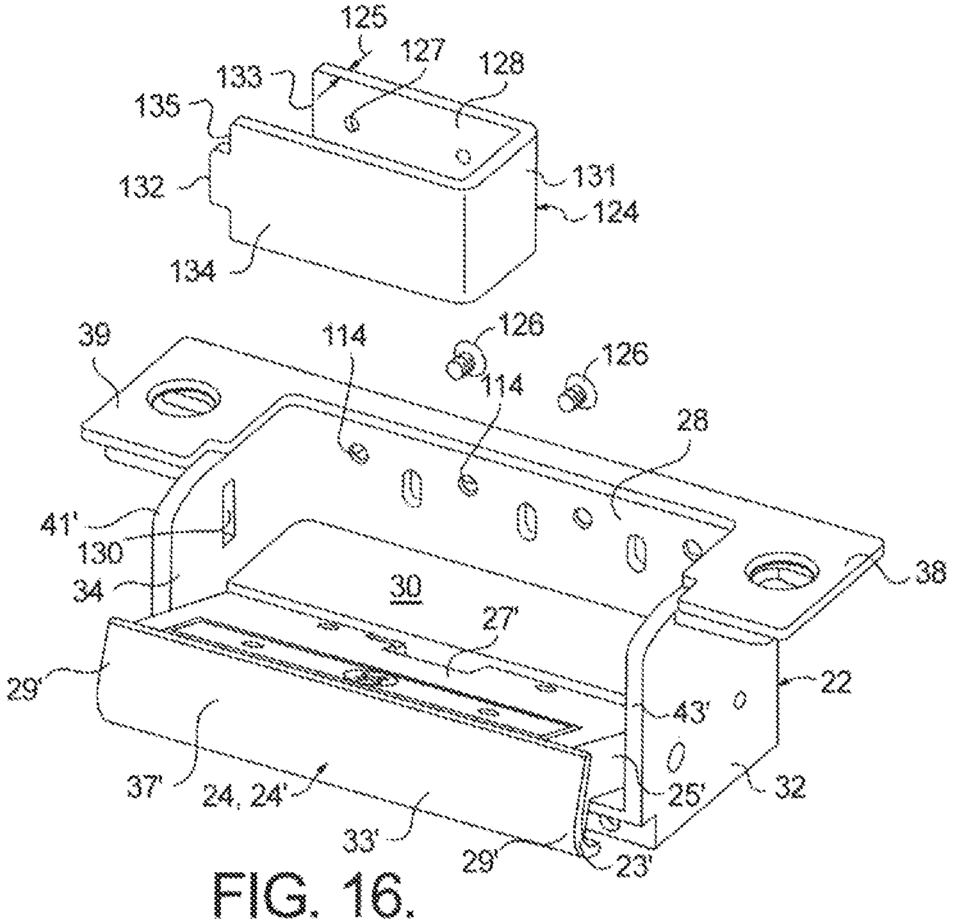
FIG. 16 is an exploded view of an actuator-controlled electric strike including a deadbolt bracket in accordance with the present invention.
Figure 17:
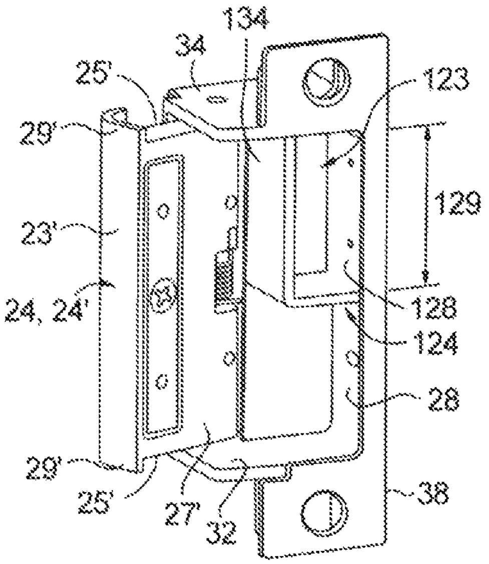
FIG. 17 is a perspective view of the actuator-controlled electric strike including a deadbolt bracket shown in FIG. 16.

As shown in FIGS. 16 and 17, strike 20 may further include an open-sided deadbolt bracket 124 comprising, for example, a rear wall 128, a bracket side wall 131, and a front wall 134, which is proportioned to receive a deadbolt (not shown), wherein a distal ends 133, 135 of bracket 124 may abut side wall 34 of housing 22, and bracket 124 and side wall 34 conjunctively define a walled deadbolt receiving chamber 123 having a vertical length 129. In the prior art, the end of the deadbolt bracket is not open but, instead, includes an end wall that is generally the thickness 125 of the bracket and abuts with side wall 34 of housing 22 when the deadbolt bracket is assembled into housing 22. Thus, in the prior art, the vertical length the deadbolt receiving chamber is reduced by the added thickness 125 of the bracket abutting side wall 34. In some cases, the reduced vertical length of the receiving chamber of a prior art deadbolt bracket interferes with an extended deadbolt, thereby preventing full engagement of the deadbolt in the strike, or preventing compatibility of the strike with some dead bolts.

Deadbolt bracket 124 in accordance with the invention may be mounted within housing 22 by a pair of screws 126 passing through holes 114 define within back wall 28 of the housing and threaded into corresponding holes 127 defined in rear wall 128 of deadbolt bracket 124. Side wall 34 may include a slot 130 configured to receive a tab 132 extending from an end 135 of front wall 134 of deadbolt bracket 124. In this manner, deadbolt bracket 124 is rigidly secured along two faces of housing 22 such that any load placed on the deadbolt latch (not shown) impacts the deadbolt bracket and housing 22 and not keeper 24.

Thus, the deadbolt receiving chamber 123 of open-sided deadbolt bracket 124 provides more room and greater vertical clearance for the associated deadbolt and, if keeper 24 were to be compromised or otherwise fail, the door would remain secure due to the deadbolt securely residing within receiving chamber 123 of deadbolt bracket 124. In addition, deadbolt bracket 124 may also be made to be interchangeable across a multitude of electric strike models. While deadbolt bracket is shown as being U-shaped in FIGS. 16 and 17, it should be understood that deadbolt bracket is not necessarily limited to this specific shape. Further, in another aspect, the open ended portion of deadbolt bracket 124 could also be oriented so that it abuts back wall 28 of housing 22 instead of side wall 34 of housing 22.

Figure 18:
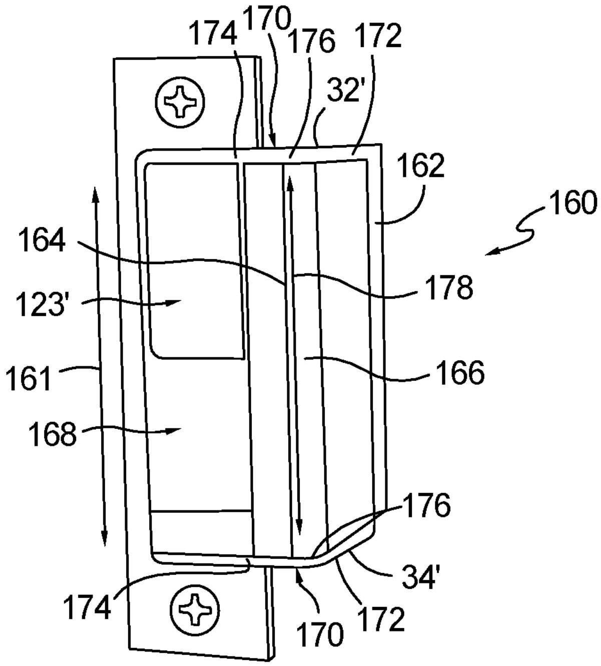
FIG. 18. PRIOR ART
FIG. 18 is a perspective view of a prior art electric strike.
Figure 19:
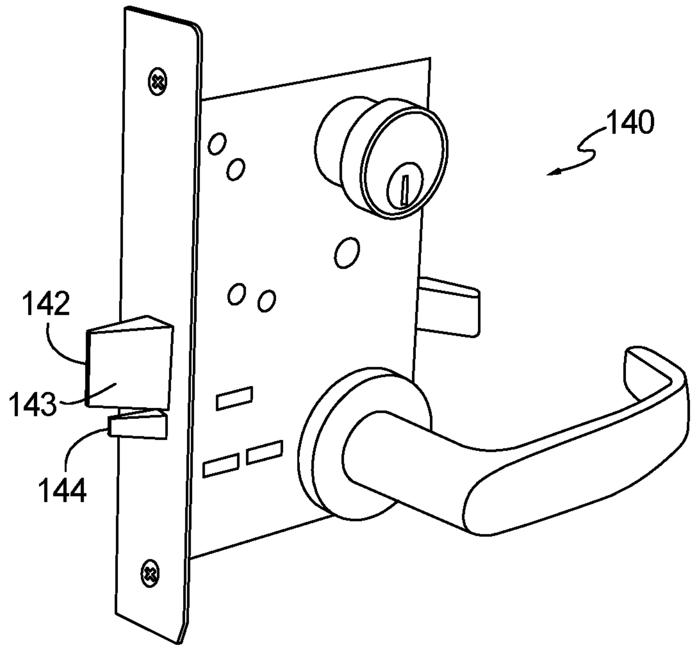
FIG. 19. PRIOR ART
FIG. 19 is a perspective view of a prior art mortise lock set.

FIGS. 18 and 19 show a typical mortise lockset 140 (FIG. 19) and a typical electric strike 160 (FIG. 18) in the prior art. Mortise lockset 140 includes latch 142 and dead latch 144 linearly spaced-apart from latch 142. Latch 142 may be a spring latch having tapered contact face for making initial contact with the keeper when the door is moved to its closed position. Dead latch 144 is reciprocally moveable between an enabling position (extended, as shown) that permits movement of the latch from its extended engaged position (as shown) to a released position, and a disabling position that prohibits movement of the latch from its engaged position to its released position. It is well known in the art that, as a door is moved to a closed position and dead latch 144 begins initial contact with an associated strike plate, latch 142 (FIG. 18) must begin to move from its extended position and toward its release position before dead latch 144 moves away from its enabling (extended) position. If the dead latch is caused to move away from its extended position first, it will prohibit movement of the latch toward its released position, thereby blocking the latch from properly entering strike cavity 168 (and preventing the door from latching).

Referring to FIG. 18, prior art electric strike 160 includes a housing 162 having side walls 32', 34', a prior art deadbolt receiving chamber 123' for receiving an extendable dead bolt (not shown), and a longitudinal length 161. Side walls 32', 34' include edge 170 comprising front edge 172, top edge 174 and front profile 176 joining front edge 172 and top edge 174 to form continuous edge 170. Prior art electric strike 160 also includes a pivotable keeper 164 (shown in a locked position), having a contoured surface 166 running the longitudinal length 178 of the keeper, wherein the entire length of contoured surface 166 resides between side walls 32', 34'. Keeper 164 pivots about pivot pin 44 about axis of rotation X (FIG. 3). Also included in electric strike 160 is receiving cavity 168 for receiving latch 142 when the door is closed. As can be seen, with a proper door to door frame alignment, and therefore a proper vertical alignment of the latch and dead latch relative to cavity 168, both the latch and dead latch will make contact with contoured surface 166 and will cause a proper sequencing of the retraction of the latch followed by the retraction of the dead latch. However, with an improper alignment, such as might be caused by a sagging door, the dead latch 144 may not make contact with contoured surface 166 and may instead contact edges 172 or 174, or front profile 176 of edges 170 before latch 142 makes contact with contoured surface 166. As a result, latch 142 is prohibited from moving toward its released position, thereby blocking the latch from entering cavity 168 and preventing the door from latching.

Referring now again to FIGS. 13, 16 and 17, in another aspect of the invention, keeper 24' may include a ramp element 23' and a keeper base 27', wherein ramp element 23' may include a contoured surface 33' that is contactable by a spring latch and/or dead latch of a lockset as the door is moved to a closed position. In this aspect, with additional reference to FIG. 3, contact surface 33' may extend a distance (A) beyond a front profile 41' of housing 22 when keeper 24' is in the locked position to prevent the spring latch and/or dead latch from contacting housing 22 or frame 120 as the door is moved to the closed position. For example, contact surface 33' may extend distance (A) beyond a front edge 43' of at least one of side walls 32, 34 when keeper 24' is in the locked position to prevent the spring latch and/or dead latch from contacting housing 22 or frame 120 as the door is moved to the closed position. Further, at least a portion of a profile 45' of contact surface 33' may be configured to match at least a portion of front profile 41' of housing 22, for example, the profile of front edge 43' of at least one of side walls 32, 34. While profile 45' of contact surface 33' is shown as being rounded, it should be understood that other profiles are also contemplated herein.

In yet another aspect of the invention, keeper 24' may optionally include at least one extension flange 29' that projects from an end of ramp element 23' that extend beyond at least one of side edges 25' of keeper base 27'. When keeper 24' is in a locked position ((FIG. 13), extension flange 29' covers front edge 43' of a respective side wall 32, 34 so that a misaligned spring latch or dead latch will contact ramp element 23' instead of front edge 43', such as, for example, a corner of housing 22. To that extent, front edge 43' of side walls 32, 34 may be contoured to accept the underside of extension flange 29' of ramp element 23' so that a top portion 37' of contact surface 33' of keeper 24' may be essentially flush with a top surface 39 of strike plate 38 mounted to strike (FIG. 3).

Figure 20B:
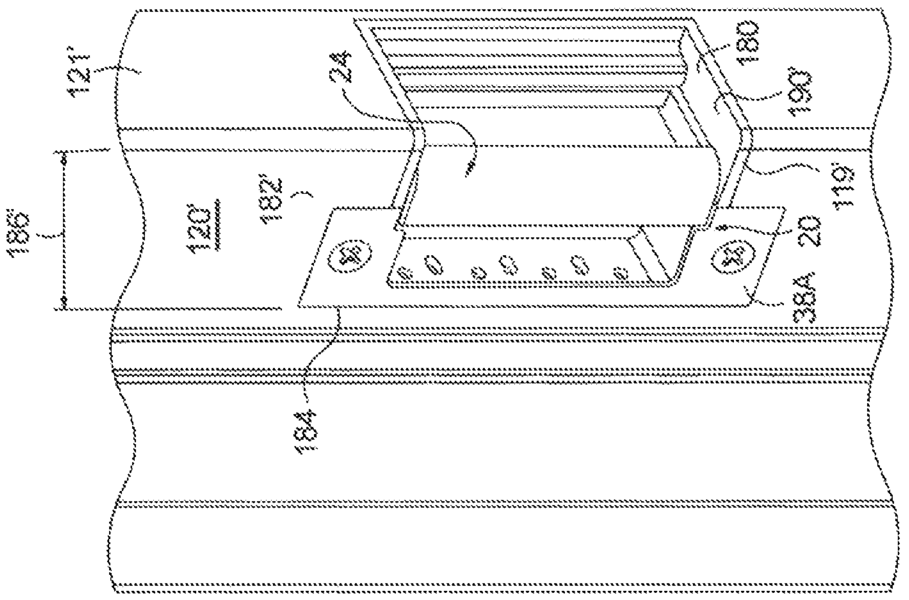
FIG. 20B is a perspective view of the actuator controlled electric strike in accordance with the invention and installed in a door frame that is wider than the door frame shown in FIG. 20A.
Figure 20A:
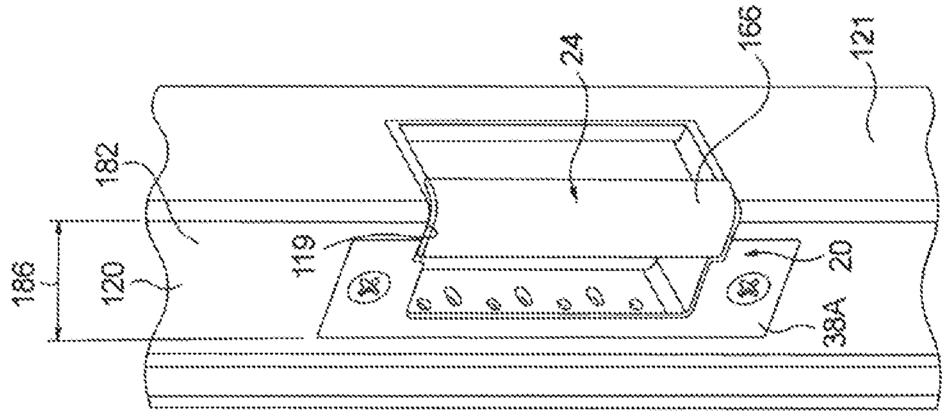
FIG. 20A is a perspective view of the actuator controlled electric strike in accordance with the invention and installed in a standard door frame.
Figure 21:
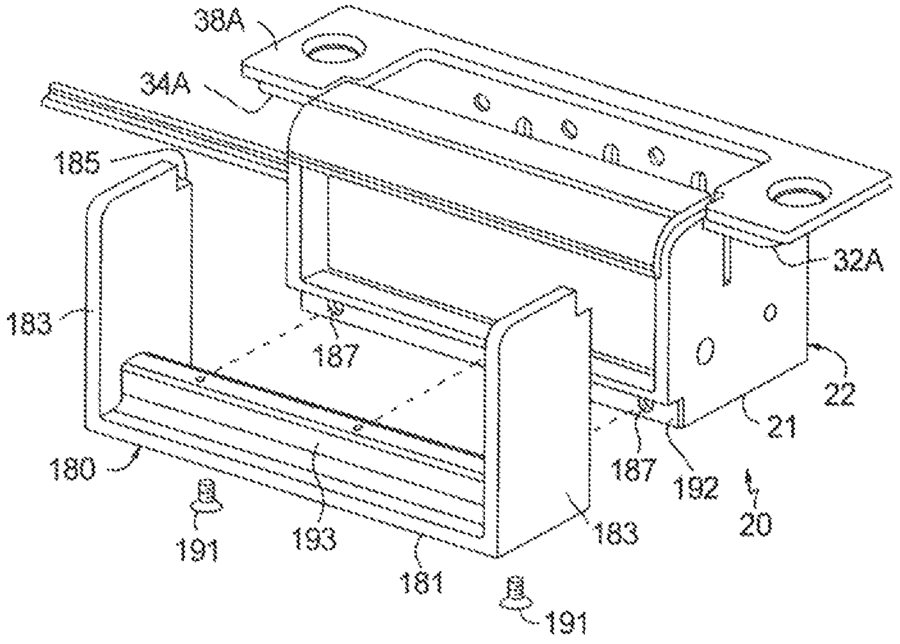
FIG. 21 is a perspective, exploded view of a lip extension and electric strike as shown in FIG. 20B, in accordance with the invention.

Several aspects of this invention have been disclosed as being desirably interchangeable across a multiple of electric strike models, thereby demonstrating the versatility of the disclosed electric strike and its ability to meet various strike needs. In another aspect of the invention, a strike lip extension can be used with the disclosed electric strike in order to make the electric strike adaptable to fit a variety of door frames that might exist in the field. Referring to FIGS. 20A, 20B and 21, U-shaped lip extension 180 may be used in conjunction with actuator controlled electric strike 20, shown in FIG. 1, when an existing door frame cut-out is wider than the a standard cut-out width.

Referring to FIG. 20A, electric strike 20 and strike plate 38A are shown mounted in cut out 119 of a standard width door frame 120 designed to receive a standard 1¾ inch thick door. As can be seen in this figure, keeper 24 is in its locked position and rounded edge 166 of keeper 24 is in close alignment with edge 121 of the door frame. Referring now to FIG. 20B, the same electric strike 20 and strike plate 38A are mounted in cut out 119' of a door frame 120' having surface 182' of door frame 120' wider that the width of surface 182 shown in FIG. 20A. In conjunction with the wider door frame and wider cut out shown in FIG. 20B, edge 184 of strike plate 38A is disposed a greater distance 186' from surface 121' of the door frame than the edge 184 of strike plate 38A is disposed from surface 121 in FIG. 20A (see dimension 186). To close out the gap 190' between electric strike 20 and frame surface 121' caused by the larger cut out 119', lip extension 180 is provided.

Referring now to FIG. 21, housing 20 of strike 22 includes a notch 192 that may run the entire length of housing 20. U-shaped lip extension 180 includes bottom panel 181 and side wings 183 extending from opposite ends of bottom panel 181 and formed at right angles to bottom panel 181 to form the U-shape. Rib 193, which may have a square or rectangular cross-section, is disposed on the bottom panel 181 and extends between side wings 183. Notches 185 are formed on the leading corners of side wings 183. The notches 185, rib 193 and length of side wings 183 are configured so that, when lip extension 180 is fitted and mounted to strike 22, the inside surface of bottom panel 181 fits closely and is adjacent to the bottom surface 21 of housing 22, notches 185 fit closely and are adjacent to strike plate 38A and housing flanges 32A, 34A, and rib 193 fits closely and adjacent to notch 192 of housing 20. Alignment holes 187 (2 of 3 shown), formed within notch 192, receive mating pegs (not shown) formed in a leading edge of bottom panel 181 to aid in further alignment of the lip extension to the strike housing. Fasteners 191, such as screws, are used to secure the lip extension to the housing. As can be seen in FIG. 20B, when electric strike 20 is then secured to door frame 120', a neat package is created whereby gap 190' is entirely concealed by U-shaped extension 180.

In accordance with a further aspect of the present invention, a method for locking or unlocking a door having an actuator-controlled electric strike for operating in conjunction with a latch of a lockset is included, wherein the latch has an engaged position so as to secure a door in a closed state and a released position, and wherein the strike includes a housing including a back wall and opposing side walls and defining an entry chamber therein; a keeper rotatably disposed hi the entry chamber about an axis for rotation between a locked position and a unlocked position; and an actuator module, including a keeper release configured to engage the keeper, and an actuator selectively movable between a first actuator position and a second actuator position, wherein when the actuator is in one of the first or second actuator positions the keeper release is coupled to the keeper and the keeper is secured in the locked position, and wherein when the actuator is selectively moved to the other of the first or second actuator positions the keeper release is decoupled from the keeper and the keeper is rotatable to the unlocked position, the method for unlatching comprising the steps of providing an input voltage to drive the actuator from a first position to a second position; after driving the actuator, using the input voltage to charge a capacitor; removing the input voltage; and providing a return voltage via the capacitor to drive the actuator from the second position to the first position.

The method may further include the actuator module having a microcontroller wherein the microcontroller senses an input polarity of the input voltage and drives the actuator from the first actuator position to the second actuator position. Further, the capacitor may be a super capacitor wherein the actuator module further includes a constant-current, constant-voltage (CCCV) charger, the microcontroller controlling the CCCV charger to charge the super capacitor after the actuator has been driven to the second actuator position, the super capacitor then providing a second voltage having a polarity opposite the input polarity to drive the actuator from the second actuator position to the first actuator position.

A method for changing an actuator module of a strike assembly is provided wherein said actuator module is a first actuating module including an actuator and a keeper release, comprising the steps of:

1) providing said strike assembly having said first actuator module disposed in a strike assembly housing wherein said housing includes a movable keeper, wherein the first actuator module includes a first actuating device comprising one of a solenoid or a motor, and further comprising a first keeper release operatively engageable with said movable keeper to selectively release said keeper from a locked position to a released position;
2) allowing for the removal of said first removable actuator module from said housing; and
3) allowing for the installation of a second removable actuator module in place of said first removable actuator module wherein the second actuator module includes a second actuating device comprising one of a solenoid or a motor, and further comprising a second keeper release operatively engageable with said movable keeper to selectively release said keeper from a locked position to a released position.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An actuator-controlled electric strike for operating in conjunction with a latch of a lockset, wherein the latch has an engaged position so as to secure a door in a closed state and a released position, the strike comprising:

a) a housing defining an entry chamber therein;
b) a keeper disposed in said entry chamber, wherein said keeper is movable between a locked position and an unlocked position;
c) a keeper support bracket movable between a first position and a second position, wherein when said keeper support bracket is in said first position, said keeper is in one of said locked position or said unlocked position, and wherein when said keeper support bracket is in said second position said keeper is in the other of said locked position or said unlocked position;

d) an actuating mechanism operatively connected to said keeper support bracket, wherein said actuating mechanism is actionable in a first direction to move said keeper support bracket toward said first position, and wherein said actuating mechanism is configured to allow said keeper support bracket to move in a second direction toward said second position, wherein said second direction is different than said first direction; and e) a biasing member applying a net force to said keeper support bracket, said biasing member comprising a first biasing mechanism and a second biasing mechanism, wherein said first biasing mechanism has at least one biasing characteristic value different from that of the said second biasing mechanism, wherein said first biasing mechanism applies a first force to said keeper support bracket in said first direction, wherein said second biasing mechanism applies a second force to said keeper support bracket in said second direction, and wherein when said keeper support bracket is in said first position, said net force of said biasing member is approximately zero.

2. The strike in accordance with claim 1 wherein said second direction is opposite of said first direction.

3. The strike in accordance with claim 1 wherein said first biasing mechanism comprises a first spring having a first spring constant, wherein said second biasing mechanism comprises a second spring having a second spring constant different from said first spring constant, and wherein said at least one biasing characteristic value comprises said first spring constant and said second spring constant.

4. The strike in accordance with claim 1 wherein said keeper support bracket includes an actuator extension that is operatively coupled to said actuating mechanism, and wherein said keeper support bracket is selectively moveable by said actuating mechanism between said first position and said second position.

5. The strike in accordance with claim 1 wherein said actuating mechanism is a stepper motor.

6. The strike in accordance with claim 1 further comprising a keeper release operatively coupled between said keeper support bracket and said keeper.

7. The strike in accordance with claim 1 further comprising a carrier operatively connected between said actuating mechanism and said keeper support bracket.

8. The strike in accordance with claim 7 wherein said carrier is formed of a polyether ether ketone polymer.

9. The strike in accordance with claim 7 wherein said actuating mechanism is a stepper motor, wherein said stepper motor includes a lead screw having a screw thread, said motor carrier has a carrier thread mateable with said screw thread, wherein when said stepper motor is actionable in either said first direction or said second direction, said motor carrier acts upon said keeper support bracket to move said keeper support bracket between said first position and said second position.

10. A method of improving the performance of an electric strike, wherein said electric strike includes a keeper movable between a locked position and an unlocked position, and a support bracket movable by an actuating mechanism between a first position and a second position, wherein when said support bracket is in said first position said keeper is in one of said locked position or said unlocked position, and wherein when said support bracket is in said second position said keeper is in the other of said locked position or said unlocked position, said method comprises the steps of:

a) providing a first biasing mechanism operatively coupled to said support bracket to apply a first force in a first direction to move said support bracket toward said first position, wherein said first biasing mechanism includes a first biasing characteristic value;

b) providing a second biasing mechanism operatively coupled to said support bracket to apply a second force in a second direction opposite said first direction to move said support bracket toward said second position, wherein said second biasing mechanism includes a second biasing characteristic value that is different than said first biasing characteristic value;

c) selecting said first and second biasing characteristic values so that a net force exerted on said support bracket by said first and second biasing mechanisms is approximately zero when said support bracket is in said first position, whereby said performance of said electric strike is improved by increasing an acceleration of said support bracket upon an initial movement of said support bracket toward one of said first position or said second position by said actuating mechanism.

11. The method in accordance with claim 10 wherein said first biasing characteristic value comprises a first spring constant, and wherein said second biasing characteristic value comprises a second spring constant different from said first spring constant.

12. The method in accordance with claim 11 comprising the further step of selecting said first and second spring constants so that said net force exerted on said support bracket by said first and second biasing mechanisms is positive in said first direction applied in said second direction when said support bracket is in said second position.

13. An actuator module for an electric strike for operating in conjunction with a latch of a lockset, wherein said latch has an engaged position so as to secure a door in a closed state and a released position, wherein said electric strike comprises a housing defining an entry chamber and a keeper disposed in said entry chamber movable between a locked position and an unlocked position, wherein said actuator module comprises:

a) a keeper support bracket movable between a blocking position and an unblocking position, wherein when said keeper support bracket is in said blocking position, said keeper is held in said locked position, and wherein when said keeper support bracket is in said unblocking position said keeper is able to be moved to said unlocked position;

b) an actuating mechanism operatively connected to said keeper support bracket and actionable in a first direction to move said keeper support bracket toward said blocking position, and actionable in a second direction to move said keeper support bracket toward said unblocking position, wherein said second direction is different than said first direction; and c) a biasing member applying a net force to said keeper support bracket, said biasing member comprising a first biasing mechanism and a second biasing mechanism, wherein a first biasing characteristic value of said first biasing mechanism is different than a second biasing characteristic value of said second spring, wherein said first biasing mechanism applies a first force to said keeper support bracket in said first direction, wherein said second biasing mechanism applies a second force to said keeper support bracket in said second direction, and wherein when said keeper support bracket is in said blocking position, said net force of said biasing member is approximately zero.

14. The strike in accordance with claim 13 wherein said second direction is opposite of said first direction.

15. The strike in accordance with claim 13 wherein said first biasing mechanism comprises a first spring having a first spring constant, wherein said second biasing mechanism comprises a second spring having a second spring constant different from said first spring constant, and wherein said at least one biasing characteristic value comprises said first spring constant and said second spring constant.

16. The actuator module in accordance with claim 13 wherein said keeper support bracket includes an actuator extension that is operatively coupled to said actuating mechanism, and wherein said keeper support bracket is selectively moveable by said actuating mechanism between said blocking position and said unblocking position.

17. The actuator module in accordance with claim 13 wherein said actuating mechanism is a stepper motor.

18. The actuator module in accordance with claim 13 further comprising a carrier operatively connected between said actuating mechanism and said keeper support bracket.

19. The actuator module in accordance with claim 18 wherein said carrier is formed of a polyether ether ketone polymer.

20. The actuator module in accordance with claim 18 wherein said actuating mechanism is a stepper motor, wherein said stepper motor includes a lead screw having a screw thread, said carrier has a carrier thread mateable with said screw thread, wherein when said stepper motor is actionable in either said first direction or said second direction, said carrier acts upon said keeper support bracket to move said keeper support bracket between said blocking position and said unblocking position.

21. A method of improving the performance of an actuator module of an electric strike, wherein said electric strike includes a keeper movable between a locked position and an unlocked position, wherein said actuator module includes a support bracket movable by an actuating mechanism between a blocking position and an unblocking position, wherein when said support bracket is in said blocking position said keeper is in said locked position, and wherein when said support bracket is in said unblocking position said keeper is in said unlocked position, said method comprises the steps of:

a) providing a first biasing mechanism operatively coupled to said support bracket to apply a first force in a first direction to move said support bracket toward said blocking position, wherein said first biasing mechanism includes a first biasing characteristic value;

b) providing a second biasing mechanism operatively coupled to said support bracket to apply a second force in a second direction opposite said first direction to move said support bracket toward said unblocking position, wherein said second biasing mechanism includes a second biasing characteristic value that is different than said first biasing characteristic value;

c) selecting said first and second biasing characteristic values so that a net force exerted on said support bracket by said first and second biasing mechanisms is approximately zero when said support bracket is in said blocking position, whereby said performance of said actuator module is improved by increasing an acceleration of said support bracket upon an initial movement of said support bracket toward said unblocking position by said actuating mechanism.

22. The method in accordance with claim 21 wherein said first biasing characteristic value comprises a first spring constant, and wherein said second biasing characteristic value comprises a second spring constant different from said first spring constant.

23. The method in accordance with claim 22 comprising the further step of selecting said first and second spring constants so that said net force exerted on said support bracket by said first and second biasing mechanisms is positive in said first direction applied in said unblocking direction when said support bracket is in said unblocking position.

24. An actuator module for an electric strike for operating in conjunction with a latch of a lockset, wherein said latch has an engaged position so as to secure a door in a closed state and a released position, wherein said electric strike comprises a housing defining an entry chamber and a keeper disposed in said entry chamber movable between a locked position and an unlocked position, wherein said actuator module comprises:

a) a keeper support bracket movable between a first position a second position, wherein when said keeper support bracket is in said first position, said keeper is in one of said locked position or said unlocked position, and wherein when said keeper support bracket is in said second position said keeper is in the other of said locked position or said unlocked position;

b) an actuating mechanism operatively connected to said keeper support bracket, wherein said actuating mechanism is actionable in a first direction to move said keeper support bracket toward said first position, and wherein said actuating mechanism is configured to allow said keeper support bracket to move in a second direction toward said second position, wherein said second direction is different than said first direction; and c) a biasing member applying a net force to said keeper support bracket, said biasing member comprising a first biasing mechanism and a second biasing mechanism, wherein said first biasing mechanism has at least one biasing characteristic value different from that of said second biasing mechanism, wherein said first biasing mechanism applies a first force to said keeper support bracket in said first direction, wherein said second biasing mechanism applies a second force to said keeper support bracket in said second direction, and wherein when said keeper support bracket is in said first position, said net force of said biasing member is approximately zero.

25. The strike in accordance with claim 24 wherein said second direction is opposite of said first direction.

26. The strike in accordance with claim 24 wherein said first biasing mechanism comprises a first spring having a first spring constant, wherein said second biasing mechanism comprises a second spring having a second spring constant different from said first spring constant, and wherein said at least one biasing characteristic value comprises said first spring constant and said second spring constant.

27. The actuator module in accordance with claim 24 wherein said keeper support bracket includes an actuator extension that is operatively coupled to said actuating mechanism, and wherein said keeper support bracket is selectively moveable by said actuating mechanism between said first position and said second position.

28. The actuator module in accordance with claim 24 wherein said actuating mechanism is a stepper motor.

29. The actuator module in accordance with claim 24 further comprising a carrier operatively connected between said actuating mechanism and said keeper support bracket.

30. The actuator module in accordance with claim 29 wherein said carrier is formed of a polyether ether ketone polymer.

31. The actuator module in accordance with claim 30 wherein said actuating mechanism is a stepper motor, wherein said stepper motor includes a lead screw having a screw thread, said carrier has a carrier thread mateable with said screw thread, wherein when said stepper motor is actionable in either said first direction or said second direction, said carrier acts upon said keeper support bracket to move said keeper support bracket between said first position and said second position.

32. A method of improving the performance of an actuator module of an electric strike, wherein said electric strike includes a keeper movable between a locked position and an unlocked position, wherein said actuator module includes a support bracket movable by an actuating mechanism between a first position and a second position, wherein when said support bracket is in said first position said keeper is in one of said locked position or said unlocked position, and wherein when said support bracket is in said second position said keeper is in the other of said locked position or said unlocked position, said method comprises the steps of:

a) providing a first biasing mechanism operatively coupled to said support bracket to apply a first force in a first direction to move said support bracket toward said first position, wherein said first biasing mechanism includes a first biasing characteristic value;

b) providing a second biasing mechanism operatively coupled to said support bracket to apply a second force in a second direction opposite said first direction to move said support bracket toward said second position, wherein said second biasing mechanism includes a second biasing characteristic value that is different than said first biasing characteristic value;

c) selecting said first and second biasing characteristic values so that a net force exerted on said support bracket by said first and second biasing mechanisms is approximately zero when said support bracket is in said first position, whereby said performance of said actuator module is improved by increasing an acceleration of said support bracket upon an initial movement of said support bracket toward one of said first position or said second position by said actuating mechanism.

33. The method in accordance with claim 32 wherein said first biasing characteristic value comprises a first spring constant, and wherein said second biasing characteristic value comprises a second spring constant different from said first spring constant.

34. The method in accordance with claim 33 comprising the further step of selecting said first and second spring constants so that said net force exerted on said support bracket by said first and second biasing mechanisms is positive in said first direction applied in said second direction when said support bracket is in said second position.

* * * * *